United States Patent
Park et al.

(10) Patent No.: US 9,526,107 B2
(45) Date of Patent: Dec. 20, 2016

(54) APPARATUS, SYSTEM AND METHOD FOR CONTROLLING RADIO RESOURCES

(71) Applicant: ELECTRONICS AND TELECOMMUNICATIONS RESEARCH INSTITUTE, Daejeon (KR)

(72) Inventors: Hyunho Park, Daejeon (KR); Hyeong Ho Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 304 days.

(21) Appl. No.: 14/314,509

(22) Filed: Jun. 25, 2014

(65) Prior Publication Data
US 2015/0124715 A1 May 7, 2015

(30) Foreign Application Priority Data

Nov. 7, 2013 (KR) .................. 10-2013-0134969
May 7, 2014 (KR) .................. 10-2014-0054086

(51) Int. Cl.
H04W 4/00 (2009.01)
H04W 72/08 (2009.01)
H04W 36/00 (2009.01)

(52) U.S. Cl.
CPC ......... H04W 72/082 (2013.01); H04W 36/005 (2013.01)

(58) Field of Classification Search
USPC .................. 370/252, 328, 329, 338, 401
See application file for complete search history.

(56) References Cited

U.S. PATENT DOCUMENTS 6,704,311 B1 * 3/2004 Chuah ............... H04L 12/6418
                                                              370/389
6,930,993 B1 * 8/2005 Hamada ............... H04W 16/04
                                                              370/337

(Continued)

FOREIGN PATENT DOCUMENTS

KR      10-2008-0070699       7/2008
WO         2007/058916        5/2007

*Primary Examiner* — Ricky Ngo
*Assistant Examiner* — Christine Ng
(74) *Attorney, Agent, or Firm* — Kile Park Reed & Houtteman PLLC

(57) ABSTRACT

An apparatus, system and method for managing radio resources are disclosed. The apparatus for managing radio resources includes a media independent services (MIS) user unit, a link layer unit, and a media independent services function (MISF) unit. The link layer unit outputs its own link status and radio resource allocation status. The MISF unit receives a report on the link status and radio resource allocation status from the link layer unit, receives a report on link status of a terminal from the corresponding terminal, receives a report on link status and radio resource allocation status of a neighboring Point of Attachment (PoA) from the corresponding neighboring PoA, and receives network configuration information from a network configuration information server. The MIS user unit determines to change radio resource allocation based on information from any one of the link layer unit, the terminal, the neighboring PoA and the network configuration information server.

20 Claims, 20 Drawing Sheets

(56) References Cited

U.S. PATENT DOCUMENTS

| | | | |
|---|---|---|---|
| 2002/0015393 A1* | 2/2002 | Pan | H04B 7/2618 370/335 |
| 2005/0078630 A1* | 4/2005 | Choi | H04W 72/1289 370/329 |
| 2008/0069049 A1* | 3/2008 | Olvera-Hernandez | H04W 36/005 370/331 |
| 2008/0305799 A1* | 12/2008 | Zuniga | H04W 36/0072 455/437 |
| 2009/0215396 A1* | 8/2009 | Rofougaran | H04L 12/40013 455/41.2 |
| 2013/0294404 A1 | 11/2013 | Hong | |
| 2014/0029448 A1* | 1/2014 | Balachandran | H04J 11/0059 370/252 |

* cited by examiner

APPARATUS, SYSTEM AND METHOD FOR CONTROLLING RADIO RESOURCES

CROSS-REFERENCE TO RELATED APPLICATIONS

This application claims the benefit of Korean Patent Application Nos. 10-2013-0134969 and 10-2014-0054086, filed Nov. 7, 2013 and May 7, 2014, respectively, which are hereby incorporated by reference herein in their entirety.

BACKGROUND OF THE INVENTION

1. Technical Field

The present disclosure relates generally to an apparatus, system and method for managing radio resources and, more particularly, to an apparatus, system and method for managing radio resources based on a media independent services (MIS) framework.

2. Description of the Related Art

Recently, various wireless communication technologies have been developed, and various heterogeneous wireless networks have been deployed and used in the same area. Accordingly, a plurality of communication technologies has shared the same frequency band and thus frequency interference has increased, with the result that the quality of experience (QoE) of users has been degraded. That is, since access points of a wireless local area network (WLAN) are installed and operated in close areas and a gradually increasing number of small-sized cells, such as femtocells, are installed and operated, a network environment has changed to a dynamic environment. In contrast, radio resource control and management are statically performed, and thus do not desirably deal with dynamic network installation and channel environments.

As illustrated in FIG. 1, as the number of access points 1 and 2 increases, the possibility that interference occurs between terminals 3 and 4 also increases. Meanwhile, cell planning is a static radio resource management method that is designed to allocate radio resource when a wireless base station is installed and to rarely change radio resource thereafter. Because of this static cell planning, network control and management capable of efficiently dealing with the dynamically varying installation and channel environments of a network are not performed.

Furthermore, although various communication technologies have been developed, frequency resources are limited. Accordingly, there are many cases where a plurality of communication technologies shares the same frequency band. Therefore, frequency interference occurs between heterogeneous networks. For example, as illustrated in FIG. 2, the 2.4 GHz and 5 GHz bands of the industry-science-medical (ISM) band that are chiefly used by wireless local area networks (WLANs) are being used or will be used by other wireless communication technologies. The 2.4 GHz band is being used by Bluetooth technology, and thus frequency interference may occur between WLAN communication and Bluetooth communication. Part of the 5 GHz band is being used for cordless phone communication, and thus interference may occur between WLAN communication and codeless phone communication.

In the 5 GHz band, there is the possibility that frequency interference will occur between new heterogeneous networks. In the 3rd Generation Partnership Project (3GPP), using the 5 GHz band as the additional frequency band of a cellular network is being discussed under the leadership of Qualcomm. If a cellular network uses the 5 GHz frequency band, interference may occur between cellular network communication and WLAN communication.

A conventional radio resource control and management method cannot deal with dynamically varying network and channel environments and frequency interference between heterogeneous networks. The conventional radio resource control and management method is a static radio resource control and management method that allocates radio resource only when an access point of a WLAN or a base station of a cellular network using the same radio access technology is installed, and thus cannot deal with dynamically varying heterogeneous network installation and channel environments. Therefore, there is a need for a dynamical, integrated method of controlling and managing the radio resource of heterogeneous networks that can deal with dynamically varying network installation and channel environments and frequency interference between heterogeneous networks.

As a related technology, Korean Patent Application Publication No. 10-2008-0070699 discloses media independent handover (MIH) technology using an Ethernet operation, administration and maintenance (OAM) protocol.

As another related technology, U.S. Patent Application Publication No. 2013-0294404 discloses technology for enabling the mobility control of a mobile terminal based on a network using a mobile router that performs the functions of a wireless base station and an access router while utilizing the existing network infrastructure of a service provider without change.

SUMMARY OF THE INVENTION

Accordingly, at least one embodiment of the present invention is intended to provide an apparatus, system and method for managing radio resources, which are capable of MIS framework-based dynamic radio resource management, thereby reducing interference between heterogeneous networks and also maximizing transmission efficiency when radio resources are used.

In accordance with an aspect of the present invention, there is provided a method of managing radio resources, including determining, by a Point of Attachment (PoA) managing the radio resource of link layers of heterogeneous networks based on a media independent services (MIS) framework or by an access controller communicating with the PoA, to change radio resource to be allocated to the PoA; commanding, by the PoA or by the access controller, a terminal to connect via new radio resource (i.e., radio resource after radio resource allocation procedure) by using current radio resource (i.e., radio resource before radio resource allocation procedure); and changing, by the PoA, the radio resource of the PoA based on a radio resource change command from the PoA or the access controller.

Determining to change the radio resource to be allocated to the PoA may include performing, by the PoA, the determination based on its own link status.

Determining to change the radio resource to be allocated to the PoA may include performing, by the PoA, the determination based on link status of the terminal.

Determining to change the radio resource to be allocated to the PoA may include performing, by the PoA, the determination based on one or more of the link status and radio resource allocation status of another PoA neighboring the former PoA.

Determining to change the radio resource to be allocated to the PoA may include performing, by the PoA, the determination based on the radio resource allocation information of an adjacent network obtained by inquiring the radio resource allocation information of the adjacent network of a network configuration information server.

Determining to change the radio resource to be allocated to the PoA may include performing, by the PoA, the determination based on a recommendation on a change in radio resource from the access controller, where the access controller may determine to recommend a change in radio resource allocation of the PoA and then notifies the PoA of radio resource to be allocated, and the PoA may perform the determination based on the notification from the access controller.

Determining to change the radio resource to be allocated to the PoA may include performing, by the access controller, the determination based on one or more of the link status and radio resource allocation status of Point of Attachments (PoAs), managed by the access controller.

Determining to change the radio resource to be allocated to the PoA may include performing, by the access controller, the determination based on the radio resource allocation information of PoAs, which are managed by the access controller, obtained by inquiring the radio resource allocation information of the PoAs of a network configuration information server.

Commanding the terminal to connect via the new radio resource may include transferring, by an MIS user unit of the PoA, a command to command the terminal to connect via the new radio resource to the media independent services function (MISF) unit of the corresponding PoA; and transferring, by the MISF unit of the PoA, a command to command the terminal to connect via the new radio resource to an MISF unit of the terminal.

Commanding the terminal to connect via the new radio resource may include transferring, by the MIS user unit of the access controller, a command to command the terminal to connect via the new radio resource to the media independent services function (MISF) unit of the corresponding access controller; and transferring, by the MISF unit of the access controller, a command to command the terminal to connect via the new radio resource to the MISF unit of the terminal.

Changing the radio resource of the PoA may include commanding, by the MIS user unit of the PoA, the link layer unit of the corresponding PoA to change radio resource from current radio resource to new radio resource via the MISF unit of the corresponding PoA; and changing, by the link layer unit of the PoA, the radio resource from the current radio resource to the new radio resource based on the command.

Changing the radio resource of the PoA may include receiving, by the MISF unit of the PoA, a command to change the radio resource of the PoA to the new radio resource, which is generated by an MIS user unit of the access controller and output via the MISF unit of the corresponding access controller; commanding, by the MISF unit of the PoA, the link layer unit of the corresponding PoA to change the radio resource of the PoA to the new radio resource; and changing, by the link layer unit of the PoA, the radio resource of the PoA from current radio resource to the new radio resource based on the command.

The method may further include reporting, by the PoA, the new radio resource to one or more network devices adjacent to the PoA.

Reporting the new radio resource to the network devices adjacent to the PoA may include requesting, by the link layer unit of the PoA, the MISF unit of the corresponding PoA to transmit a message reporting the new radio resource; transmitting, by the MISF unit of the PoA, a message reporting the new radio resource to the MISF units of the network devices; and reporting, by the MISF units of the network devices, the new radio resource of the PoA to the MIS user units of the corresponding network devices based on the received message.

In accordance with another aspect of the present invention, there is provided an apparatus for managing radio resources of link layers of heterogeneous networks based on an MIS framework, including an MIS user unit; a link layer unit configured to output its own link status and radio resource allocation status; and an MISF unit configured to receive a report on the link status and radio resource allocation status from the link layer unit and transfer this report to the MIS user unit, to receive a report on the link status of a terminal from the corresponding terminal and transfer this report to the MIS user unit, to receive a report on the link status and radio resource allocation status of a neighboring PoA from the corresponding neighboring PoA and transfer this report to the MIS user unit, and to receive network configuration information from a network configuration information server and transfer the network configuration information to the MIS user unit; wherein the MIS user unit determines to change radio resource allocation based on information from any one of the link layer unit, the terminal, the neighboring PoA and the network configuration information server.

The MISF unit may notify the terminal of new radio resource using current radio resource before changing its own radio resource, and may report the new radio resource to the MIS user unit and one or more adjacent network devices.

The radio resource may include a frequency band, transmission power, a time slot, and beamforming.

In accordance with still another aspect of the present invention, there is provided a system for managing radio resources, including a network configuration information server configured to output network configuration information; a radio resource management PoA configured to allocate and manage its own radio resource based on any one of the status of its own link layer, the status of the link layer of a terminal from the corresponding terminal, the link status and radio resource allocation status of a corresponding neighboring PoA from the neighboring PoA, and network configuration information from the network configuration information server; and an access controller configured to determine the radio resource allocation of the radio resource management PoA based on the link status and radio resource allocation status of one or more PoAs managed by the access controller including one or more of the radio resource management PoA and the neighboring PoA, and the network configuration information from the network configuration information server.

The radio resource management PoA may distribute the data traffic of the terminal among a plurality of link layers of the radio resource management PoA.

The access controller may distribute the data traffic of the terminal among a plurality of radio resource management PoAs.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
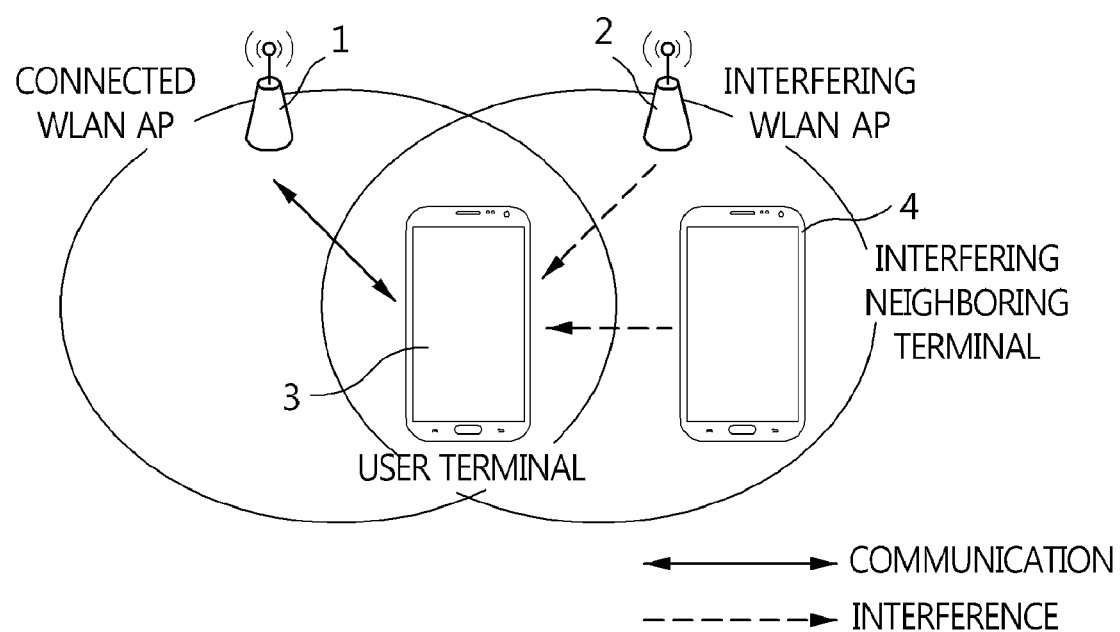
FIG. 1 is a diagram illustrating an example of communication status between terminals on a network.
Figure 2:
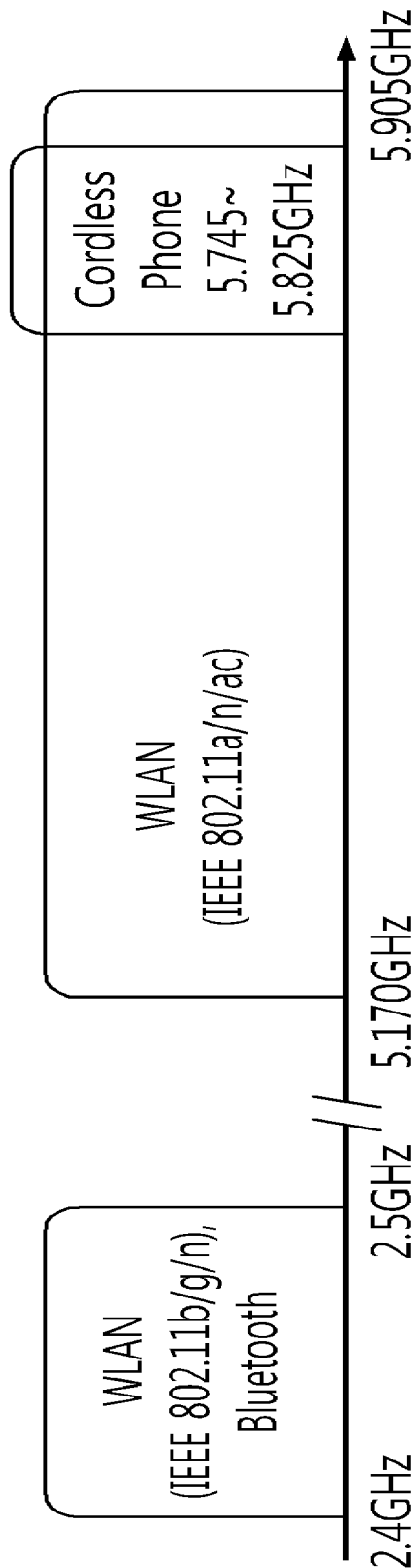
FIG. 2 is a diagram illustrating frequency interference between heterogeneous networks.

Currently, the IEEE 802.21 Media Independent Handover (MIH) standard, which is a technology standard that supports handover between heterogeneous networks, provides the integrated control of heterogeneous radio interfaces.

The IEEE 802.21 Working Group (WG) extended the scope of the corresponding standard from handover between heterogeneous networks to interworking between heterogeneous networks, and is performing the standardization of the interworking between heterogeneous networks. Accordingly, the term "MIH" meaning media independent handover was replaced with the term "MIS" meaning media independent services.

That is, the IEEE 802.21 WG responsible for the standard IEEE 802.21 extended MIH technology supporting handover between heterogeneous networks to MIS technology including various heterogeneous network interworking technologies, and is performing the standardization of the MIS technology.

The control of D2D communication and technology for managing the radio resource of heterogeneous networks are being discussed based on the MIS technology including various interworking technologies.

Furthermore, the existing term "MIH" of the IEEE 802.21 standard was replaced with the term "MIS," and thus it was decided that the term "MIH user" referring to a network layer and its upper layers would be replaced with the term "MIS user." As a result, the term "MIS," rather than the existing term "MIH", is used herein as a term that describes the technology of IEEE 802.21.

The present invention may be subject to various modifications, and may have various embodiments. Specific embodiments are illustrated in the diagrams and described in detail.

However, this is not intended to limit the present invention to the specific embodiments, but it should be appreciated that all modifications, equivalents and replacements included in the spirit and technical range of the present invention fall within the scope of the present invention.

The terms used herein are used merely to illustrate specific embodiments, and are not intended to limit the present invention. Unless otherwise stated clearly, a singular expression includes a plural expression. In the specification and claims, it should be understood that the term "comprise," "include," "have" and their variants are intended merely to designate the presence of features, numbers, steps, operations, elements, parts or combinations thereof described in the specification, and should not be construed as excluding the presence or additional probability of one or more different features, numbers, steps, operations, elements, parts or combinations thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments of the present invention are described in detail below with reference to the accompanying drawings. In the following description of the embodiments, the same reference numerals are assigned to the same elements throughout the drawings and also redundant descriptions of the same elements are omitted in order to make the overall understanding easier.

Figure 3:
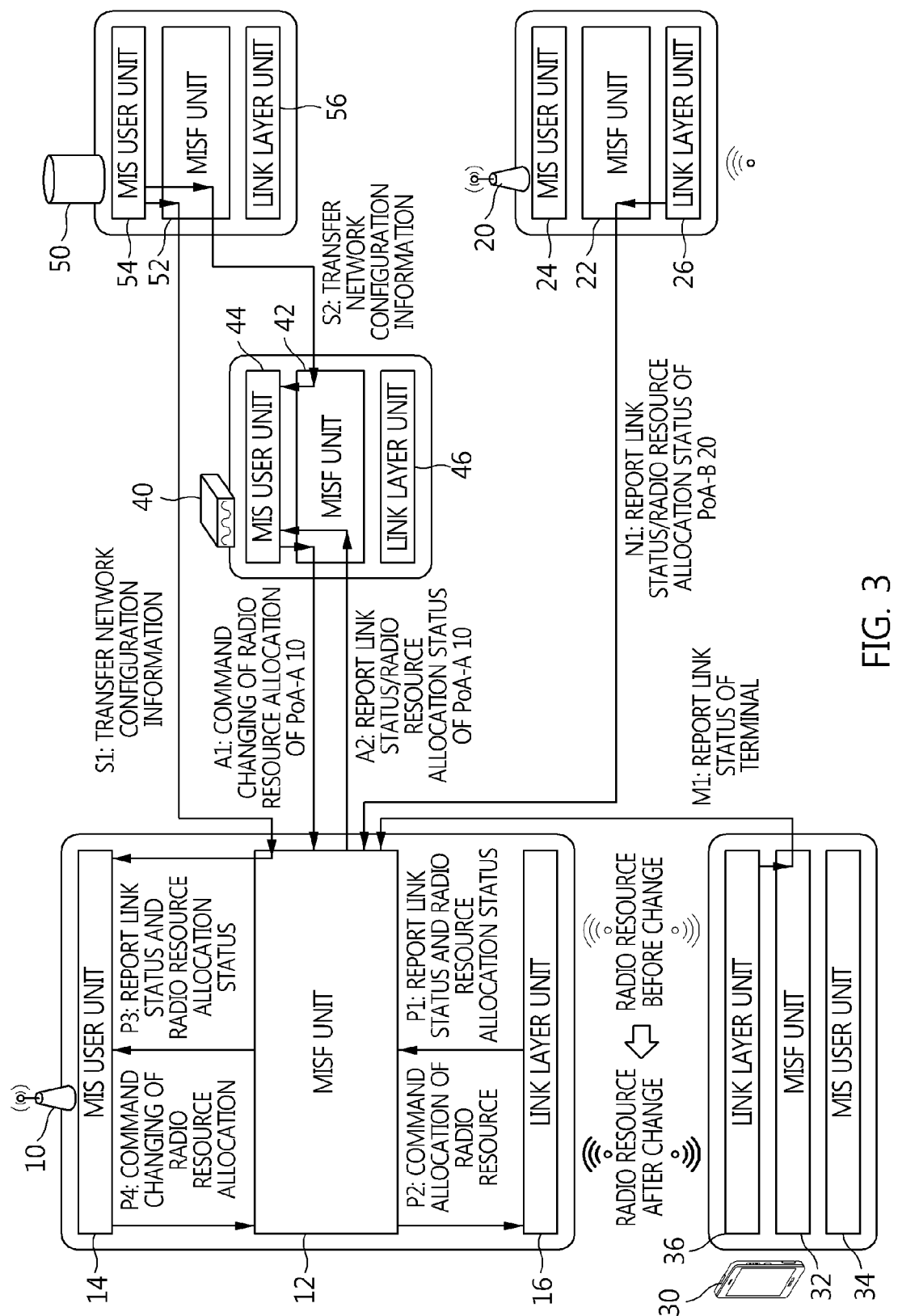
FIG. 3 is a diagram illustrating the configuration of a system for managing radio resources according to an embodiment of the present invention.

FIG. 3 is a diagram illustrating the configuration of a system for managing radio resources according to an embodiment of the present invention.

The system for managing radio resources includes a Point of Attachment (PoA) 10, a neighboring PoA 20, a terminal 30, an access controller 40, and a network configuration information server 50. In this case, the PoA 10 is a PoA that allocates and manages radio resources using an MIS framework, and may be referred to as a "radio resource management PoA." The neighboring PoA 20 may be understood as a PoA that helps the allocation of radio resource at the PoA 10. Meanwhile, each of the PoA 10, the neighboring PoA 20, the terminal 30, the access controller 40, and the network configuration information server 50 may be considered to be an apparatus for managing radio resources.

In FIG. 3, the PoA 10 manages radio resources. The PoA 10 is a network side endpoint of a link layer (a physical layer and a data link layer) in terms of a network, and corresponds to an access point of a WLAN or a base station of a cellular network.

In this case, the PoA 10 may be considered to be a physical PoA (PoA-A).

The allocation of radio resource at the PoA 10 is performed through the exchange of information with the PoA 10 itself or another network device (for example, a neighboring PoA 20, an access controller 40, or a network configuration information server 50).

In this case, the radio resource may be a frequency band in terms of frequency, transmission power in terms of transmission power, a time slot in terms of time, and beamforming in terms of the setup of transmission and reception antennas.

The PoA 10 selects and allocates its own radio resource based on the status (for example, signal strength, data rate, etc.) of its own link layer (a physical layer and a data link layer). That is, the PoA 10 may manage its own radio resource for itself.

In some cases, the PoA 10 may have link layers based on a plurality of communication technologies. For example, the PoA 10 may have LTE and WLAN link layers at the same time.

The PoA 10 may use a media independent event services (MIES) primitive and a media independent command services (MICS) primitive. In this case, the MIES primitive may be used to report link status to a higher communication layer, and the MICS primitive may be used for a higher communication layer to control a lower communication layer.

The PoA 10 may allocate its own radio resource based on the link layer status of the corresponding terminal 30 reported by the terminal 30.

The PoA 10 includes a media independent services function (MISF) unit 12, a media independent services (MIS) user unit 14, and a link layer unit 16.

The MISF unit 12 performs the function of MIS. MIS may perform various network interworking between heterogeneous networks. The MISF unit 12 may be a MIS function unit that is described in the claims of the present application.

The MIS user unit 14 is a layer unit using the heterogeneous network interworking service of the MISF unit 12, and has layer three or higher layer protocols (Layer 3 or higher mobility protocol (L3MP)). The MIS user unit 14 may be an MIS user unit that is described in the claims of the present application.

The link layer unit 16 may include a physical layer and a data link layer. The status of the link layer unit 16 is the status of the physical layer or data link layer, and an example thereof may be transmission efficiency, such as signal strength, transmission speed or latency.

The neighboring PoA 20 is a PoA neighboring the PoA 10. The neighboring PoA 20 may report the link status or radio resource allocation status of the corresponding neighboring PoA 20 to the PoA 10. Accordingly, the PoA 10 may allocate its own radio resource based on the link status or radio resource allocation status of the corresponding neighboring PoA 20 reported by the neighboring PoA 20. In this case, the radio resource allocation status refers to the status of radio resource that enable wireless communication.

Since the neighboring PoA 20 neighbors the PoA 10, it may cause radio interference with the PoA 10 depending on the installation status thereof.

The neighboring PoA 20 may transfer its own link status or radio resource allocation status to the PoA 10 by using an MIES message. The neighboring PoA 20 may be considered to be a physical PoA (PoA-B).

The neighboring PoA 20 includes an MISF unit 22, an MIS user unit 24, and a link layer unit 26, like the PoA 10. The functions of the MISF unit 22, the MIS user unit 24 and the link layer unit 26 correspond to those of the above-described MISF unit 12, the above-described MIS user unit 14 and the above-described link layer unit 16, respectively.

The terminal 30 is a terminal that connects with the PoA 10. The terminal 30 may transfer its own link layer status to the PoA 10 by using an MIES message.

The terminal 30 includes an MISF unit 32, an MIS user unit 34, and a link layer unit 36, like the PoA 10. The functions of the MISF unit 32, the MIS user unit 34 and the link layer unit 36 can be sufficiently understood from the following description.

The access controller 40 may allocate the radio resource of the PoA 10 based on link status in connection with the PoA 10, the radio resource allocation status of PoAs (for example, the PoA 10 and the neighboring PoA 20) managed by it, network configuration information, etc.

That is, the access controller 40 is a network device capable of allocating and managing the radio resources of the PoAs 10 and 20, and may also manage one or more terminals that connect with the PoA 10 or 20 managed by it if necessary.

Furthermore, if necessary, the access controller 40 may manage the data traffic of the one or more terminals that connect with the PoA 10 or 20.

The access controller 40 may be implemented using MIS-Point of Service (PoS), which is a network entity having an MIS function. The access controller 40 may receive the link status of the PoA 10 that is transmitted by the PoA 10 via an MIES message.

Meanwhile, the access controller 40 may command the PoA 10 to perform radio resource allocation by using an MICS message.

The access controller 40 includes an MISF unit 42, an MIS user unit 44, and a link layer unit 46, like the PoA 10. The functions of the MISF unit 42, the MIS user unit 44 and the link layer unit 46 correspond to those of the above-described MISF unit 12, the above-described MIS user unit 14 and the above-described link layer unit 16, respectively. The functions of the MISF unit 42, the MIS user unit 44 and the link layer unit 46 can be understood in detail from the following description.

The network configuration information server 50 stores and manages network configuration information. The network configuration information server 50 may transfer network configuration information to the PoA 10 or access controller 40 by using a media independent information service (MIIS) message. In this case, the network configuration information is information about the installation configuration of a network. For example, the network configuration information may include a location at which a PoA has been installed, the allocation status of radio resources allocated to PoAs, etc.

Accordingly, the PoA 10 may allocate and manage its own radio resource based on the network configuration information, and the access controller 40 may allocate and manage the radio resource of the PoA 10.

The network configuration information server 50 may be implemented using an information server, which is a server that manages network configuration information in accordance with the IEEE 802.21-2008 standard.

The network configuration information server 50 includes an MISF unit 52, a MIS user unit 54, and a link layer unit 56, like the PoA 10. The functions of the MISF unit 52, the MIS user unit 54 and the link layer unit 56 correspond to those of the above-described MISF unit 12, the above-described MIS user unit 14 and the above-described link layer unit 16, respectively. The functions of the MISF unit 52, the MIS user unit 54 and the link layer unit 56 can be understood in detail from the following description.

The internal signaling of the PoA 10 illustrated in FIG. 3 is described as follows. P1 is signaling from the link layer unit 16 to the MISF unit 12, and the link layer unit 16 reports its own link status and radio resource allocation status to the MISF unit 12 by using an MIES primitive. P2 is signaling from the MISF unit 12 to the link layer unit 16, and the MISF unit 12 commands the link layer unit 16 to perform radio resource allocation by using an MICS primitive. P3 is signaling from the MISF unit 12 to the MIS user unit 14, and the MISF unit 12 reports the link status of the link layer unit 16 and radio resource allocation status to the MIS user unit 14 by using an MIES primitive. P4 is signaling from the MIS user unit 14 to the MISF unit 12, and the MIS user unit 14 commands the MISF unit 12 to change the radio resource allocation of the link layer unit 16 by using an MICS primitive.

Now, signaling between the PoA 10 and the terminal 30 illustrated in FIG. 3 is described. M1 is signaling between the terminal 30 and the PoA 10, and the terminal 30 reports the link status of the corresponding terminal 30 to the PoA 10. In order to perform signaling M1, an MIES message may be used.

Now, signaling between the PoA 10 and the neighboring PoA 20 illustrated in FIG. 3 is described. N1 is signaling from the neighboring PoA 20 to the PoA 10, and the neighboring PoA 20 reports the link status and radio resource allocation status of the corresponding neighboring PoA 20 to the PoA 10. In order to perform signaling N1, an MIES message may be used.

Now, signaling between the PoA 10 and the access controller 40 illustrated in FIG. 3 is described. A1 is signaling from the access controller 40 to the PoA 10, and the access controller 40 commands the PoA 10 to perform the radio resource control of the PoA 10. In order to perform signaling A1, an MICS message may be used. A2 is signaling from the PoA 10 to the access controller 40, and the PoA 10 reports the link status and radio resource allocation status of the corresponding PoA 10 to the access controller 40. In order to perform signaling A2, an MIES message may be used.

Now, signaling between the PoA 10 and the network configuration information server 50 illustrated in FIG. 3 is described. S1 is signaling from the network configuration information server 50 to the PoA 10, and the network configuration information server 50 transfers the network configuration information (for example, the network configuration information of the neighboring PoA 20) of an area adjacent to the PoA 10 to the PoA 10. In order to perform signaling S1, an MIIS message may be used.

Now, signaling between the access controller 40 and the network configuration information server 50 illustrated in FIG. 3 is described. S2 is signaling from the network configuration information server 50 to the access controller 40, and the network configuration information server 50 transfers the network configuration information of one or more PoAs (for example, the PoA 10 and the neighboring PoA 20) that can be controlled by the access controller 40 to the access controller 40. In order to perform signaling S2, an MIIS message may be used.

Figure 4:
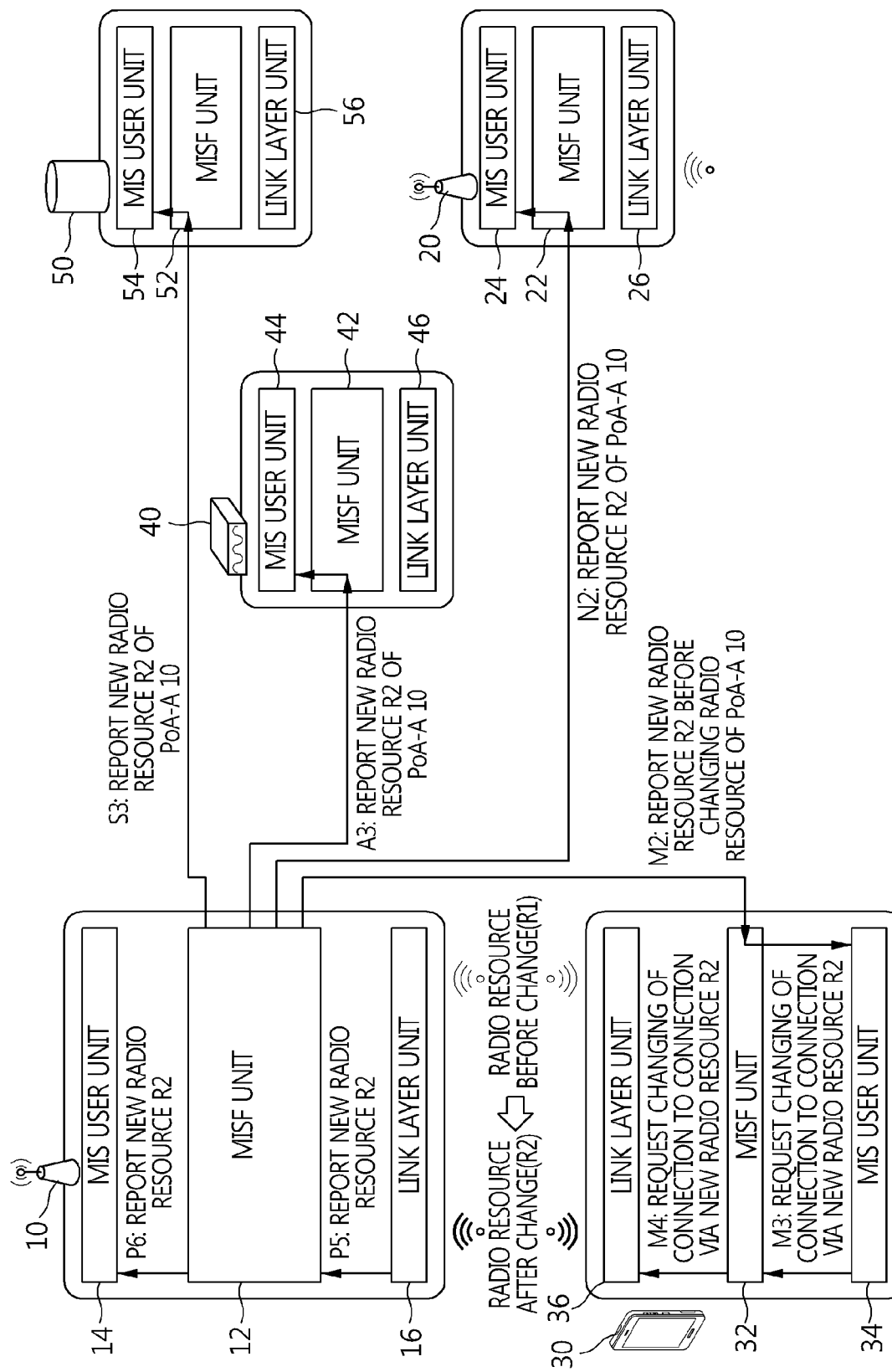
FIG. 4 is a diagram illustrating reporting information about the new radio resource of a PoA and changing the connection of a terminal illustrated in FIG. 3.

FIG. 4 is a diagram illustrating a report on the target radio resource information of the PoA 10 and a change in the connection of the terminal 30 illustrated in FIG. 3.

Before changing radio resource, the PoA 10 notifies the terminal 30 of the new radio resource R2 of the PoA 10 by using current radio resource R1. Accordingly, the terminal 30 may change its connection based on the new radio resource.

After the PoA 10 has changed the radio resource (that is, from the radio resource R1 to the radio resource R2), the MISF unit 12 of the PoA 10 reports the new radio resource information R2 to not only its own MIS user unit 14 but also adjacent PoAs (for example, the neighboring PoA 20, the access controller 40, and the network configuration information server 50).

Now, signaling between the PoA 10 and the terminal 30 illustrated in FIG. 4 is described. M2 is signaling from the PoA 10 to the terminal 30, and the PoA 10 notifies the terminal 30 of the new radio resource R2 before radio resource are changed. In order to perform signaling M2, an MIES message may be used.

Now, the internal signaling of the terminal 30 is described. M3 is signaling from the MIS user unit 34 to the MISF unit 32, and the MIS user unit 34 requests the MISF unit 32 to make a change in connection based on new radio resource R2 by using an MICS primitive. M4 is signaling from the MISF unit 32 to the link layer unit 36, and the MISF unit 32 requests the link layer unit 36 to make a change in connection based on the new radio resource R2 by using an MICS primitive.

Now, the internal signaling of the PoA 10 is described. P5 is signaling from the link layer unit 16 to the MISF unit 12, and the link layer unit 16 reports the new radio resource R2 to the MISF unit 12 via an MIES primitive after the radio resource of the PoA 10 have been changed. P6 is signaling from the MISF unit 12 to the MIS user unit 14, and the MISF unit 12 reports the new radio resource R2 to the MIS user unit 14 via an MIES primitive.

Now, signaling between the PoA 10 and the neighboring PoA 20 is described. N2 is signaling from the PoA 10 to the neighboring PoA 20, and the PoA 10 reports the new radio resource allocation status of the PoA 10 to the neighboring PoA 20. In order to perform signaling N2, an MIES message may be used.

Now, signaling between the PoA 10 and the access controller 40 is described. A3 is signaling from the PoA 10 to the access controller 40, and the PoA 10 reports the new radio resource (R2) allocation status of the PoA 10 to the access controller 40. In order to perform signaling A3, an MIES message may be used.

Now, signaling between the PoA 10 and the network configuration information server 50 is described. S3 is signaling from the PoA 10 to the network configuration information server 50, and the PoA 10 reports the new radio resource (R2) allocation status of the PoA 10 to the network configuration information server 50. In order to perform signaling S3, an MIES message may be used.

Figure 5:
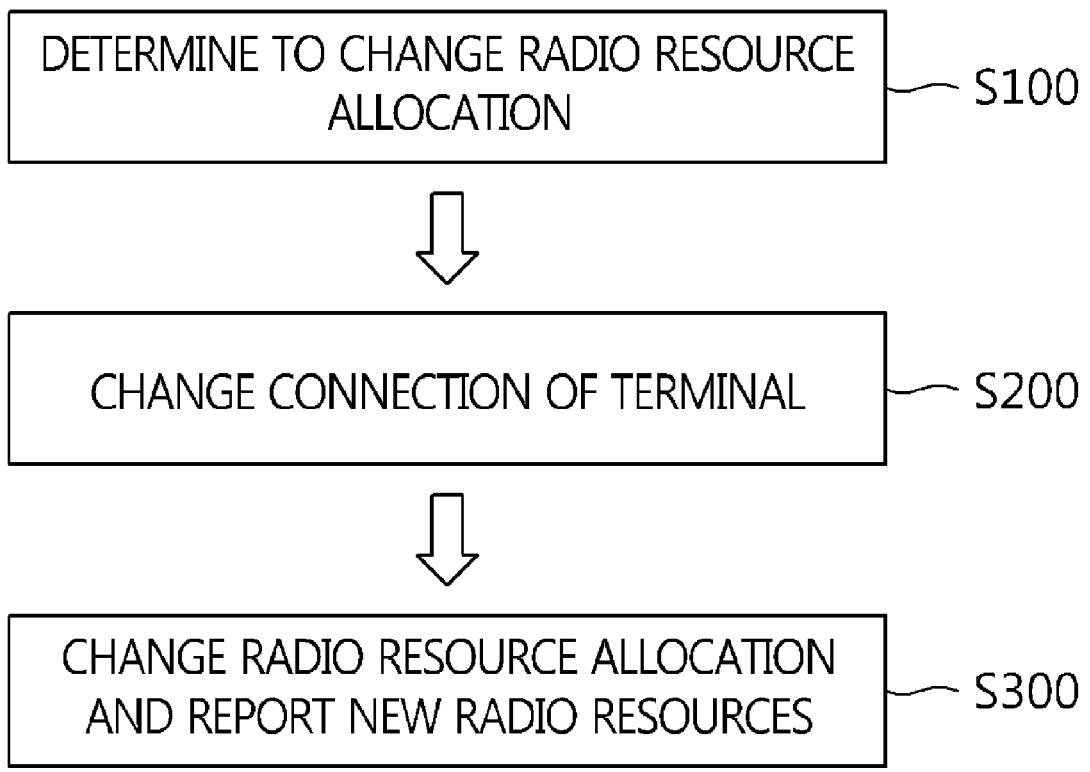
FIG. 5 is a flowchart illustrating a method of managing radio resources according to an embodiment of the present invention.

FIG. 5 is a flowchart illustrating a method of managing radio resources according to an embodiment of the present invention.

The method of managing radio resources according to this embodiment of the present invention includes step S100 of determining to change the radio resource allocation of the PoA 10, step S200 of changing radio resource (for example, from R1 to R2) used for the connection of the terminal 30 to the PoA 10, and step S300 of changing, by the PoA 10, the radio resource allocation, and reporting, by the PoA 10, its own new radio resource allocation to another PoA (for example, the neighboring PoA 20), the access controller 40 and the network configuration information server 50.

In this case, at step S100 of determining to change radio resource allocation, the PoA 10 or the access controller 40 may determine to change the radio resource allocation of the PoA 10.

For example, the PoA 10 may determine to change its own radio resource allocation based on the link status of the PoA 10 itself or the connected terminal 30, the link status and/or radio resource allocation status of its adjacent PoA (for example, the neighboring PoA 20), the radio resource allocation change request of the access controller 40, network configuration information, etc. This is described in detail with reference to the flowcharts of FIGS. 6 to 10.

Figure 6:
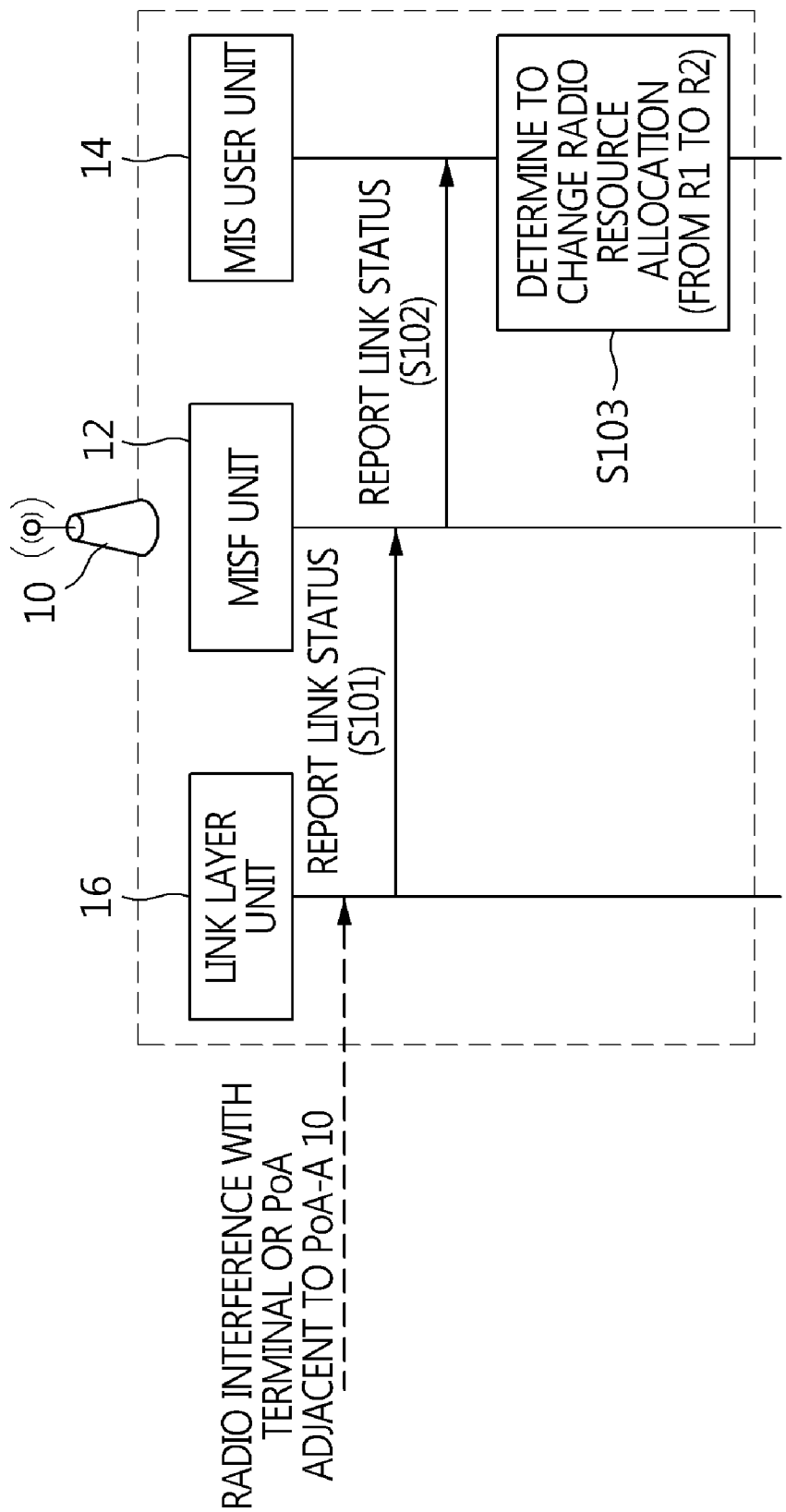
FIGS. 6 to 12 are diagrams illustrating the process of determining to change radio resource allocation illustrated in FIG. 5.

FIG. 6 illustrates the case where the PoA 10 determines to change radio resource allocation based on its own link status. That is, the PoA 10 may detect its degraded link status attributable to frequency interference with an adjacent terminal or a PoA (for example, the neighboring PoA 20), and may change its own radio resource allocation.

First, when the PoA 10 experiences radio interference with the adjacent terminal or the adjacent PoA, the link layer unit 16 of the corresponding PoA 10 reports the degraded link status to the MISF unit 12 by using an MIES primitive of the existing IEEE 802.21-2008 standard at step S101. An example of this MIES primitive is Link_Parameters_Report-.indication.

Thereafter, the MISF unit 12 of the PoA 10 reports the degraded link status to the MIS user unit 14 by using an MIES primitive of the existing IEEE 802.21-2008 standard at step S102. An example of this MIES primitive is MIH_Link_Parameters_Report.indication.

Thereafter, the MIS user unit 14 of the PoA 10 determines to change radio resource allocation (that is, from the radio resource R1 to the radio resource R2) based on the reported link status of the PoA 10 at step S103. The new radio resource R2 are different from the existing radio resource R1 in terms of a frequency band, transmission power, a time slot and beamforming.

Figure 7:
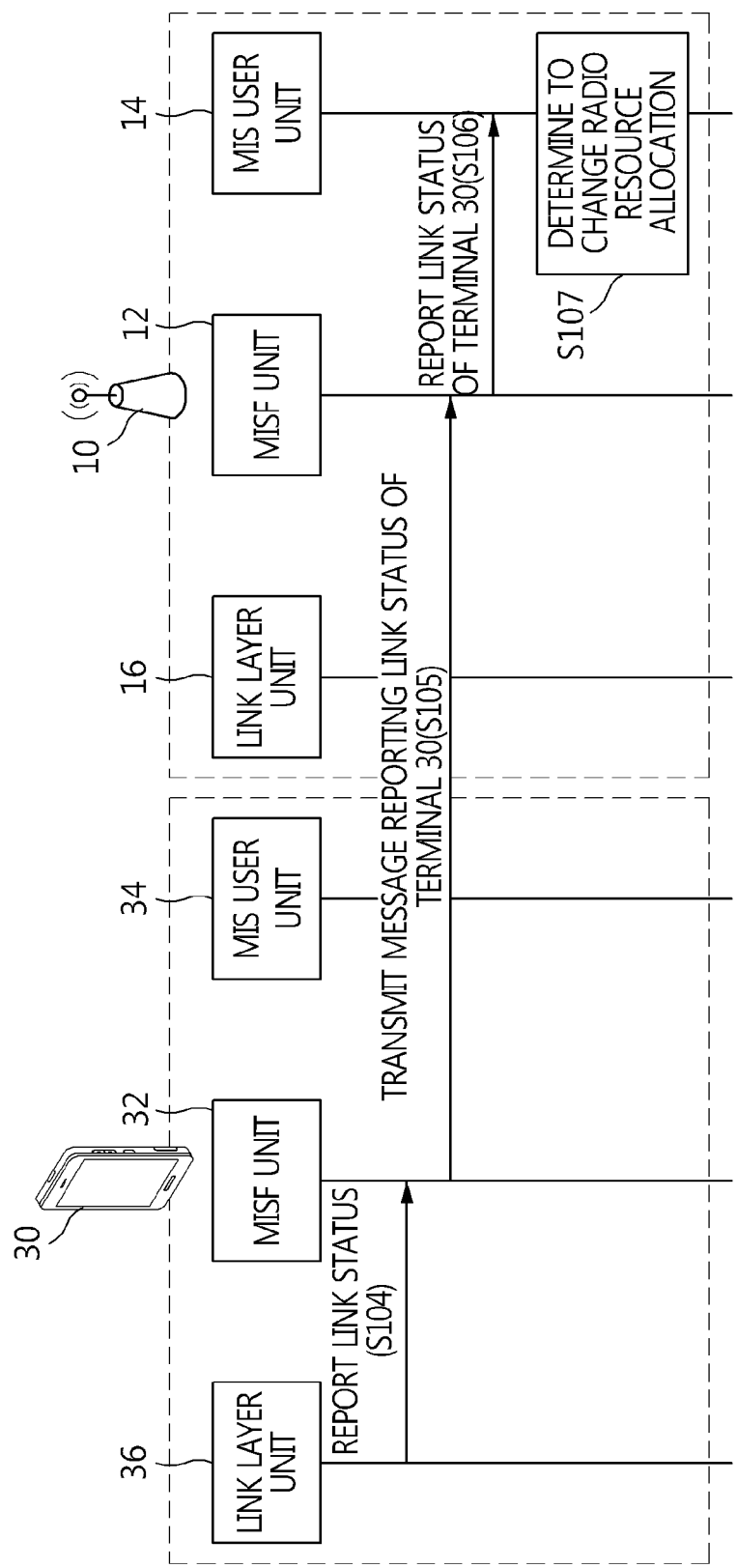

FIG. 7 illustrates the case where the PoA 10 determines to change radio resource allocation based on the link status of the terminal 30. That is, the PoA 10 may change its own radio resource allocation based on the link status of the corresponding terminal 30 reported by the terminal 30.

First, the link layer unit 36 of the terminal 30 reports the degraded link status to the MISF unit 32 by using an MIES primitive of the existing IEEE 802.21-2008 standard at step S104. An example of this MIES primitive is Link_Parameters_Report.indication.

Thereafter, the MISF unit 32 of the terminal 30 reports the degraded link status of the terminal 30 to the MISF unit 12 of the PoA 10 by using an MIES message of the existing IEEE 802.21-2008 standard at step S105. An example of this MIES message is MIH_Link_Parameters_Report indication.

Accordingly, the MISF unit 12 of the PoA 10 reports the degraded link status of the terminal 30 to the MIS user unit 14 of the corresponding PoA 10 by using an MIES primitive of the existing IEEE 802.21-2008 standard at step S106. An example of this MIES primitive is Link_Parameters_Report.indication.

The MIS user unit 14 of the PoA 10 determines new radio resource R2 based on the link status of the terminal 30 at step S107.

Figure 8:
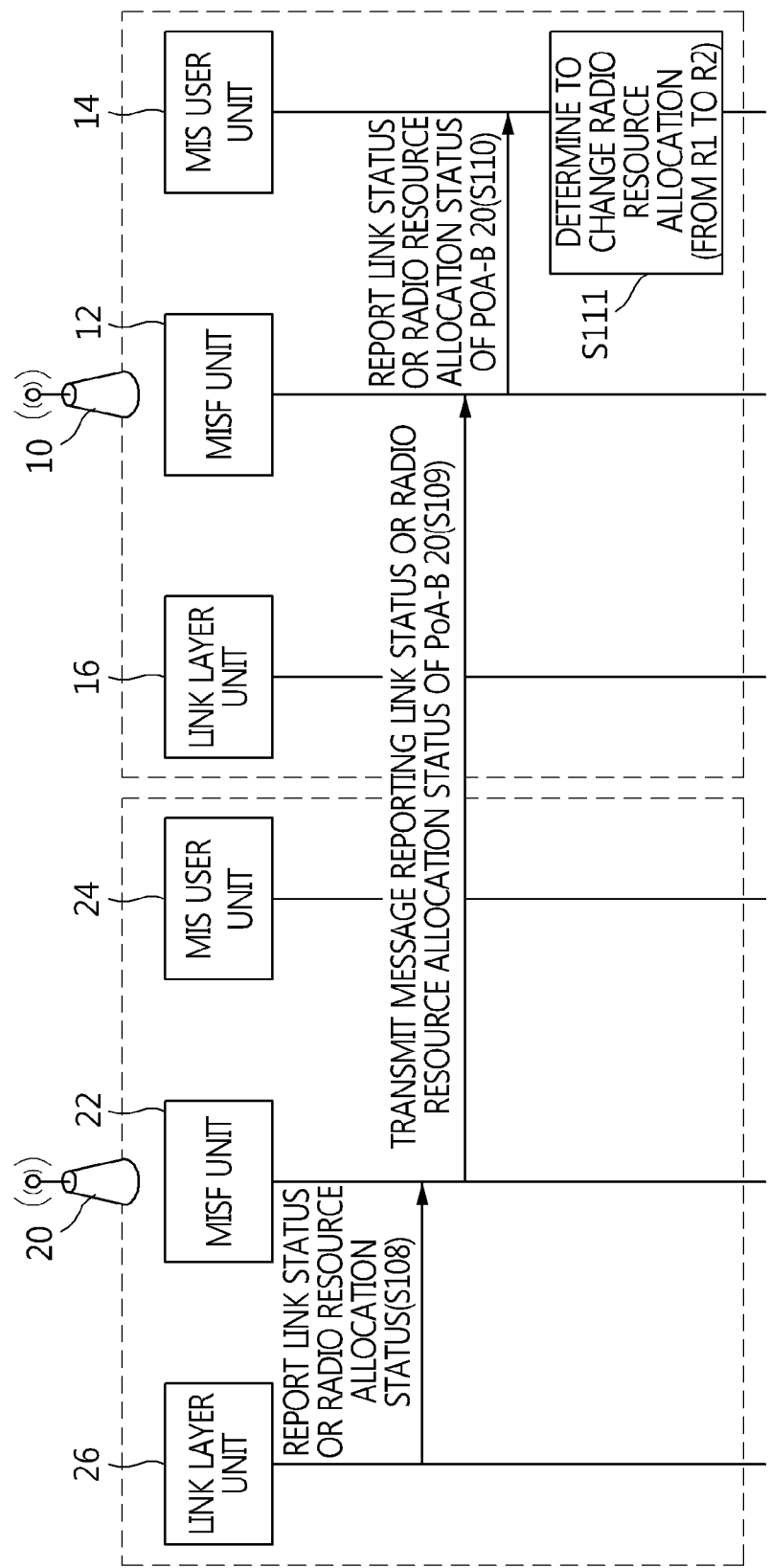

FIG. 8 illustrates the case where the PoA 10 determines to change radio resource allocation based on the link status/ radio resource allocation status of the neighboring PoA 20. That is, the PoA 10 may change its own radio resource allocation based on the link status or radio resource allocation status of the corresponding neighboring PoA 20 reported by the neighboring PoA 20. For example, the PoA 10 may receive a report on the degraded link status of the neighboring PoA 20, and may change its own radio resource allocation. The PoA 10 may detect the radio resource of the neighboring PoA 20 being the same as the radio resource of the corresponding PoA 10 (that is, the neighboring PoA 20 also uses R1), and may change allocation to other radio resource R2.

First, the link layer unit 26 reports the degraded link status or radio resource allocation status of the neighboring PoA 20 to the MISF unit 22 at step S108. An example of an existing MIES primitive used to report the link status of the neighboring PoA 20 is Link_Parameters_Report.indication. In order to report the radio resource allocation status of the neighboring PoA 20, a new MIES primitive is required. In connection with the present invention, "Link_Resource_Report.indication" is proposed as the name of the corresponding primitive. The new primitive Link_Resource_Report.indication may require information about the link ID (for which the existing parameter LINK_ID may be used) of the neighboring PoA 20, a frequency band (for which a new parameter is required; an example of the name of this parameter is LINK_FREQ) which is a radio resource used by the neighboring PoA 20, transmission power (for which a new parameter is required; an example of the name of this parameter is LINK_TX_POWER), a time slot (for which a new parameter is required; an example of the name of this parameter is LINK_TIME_SLOT), and beamforming (for which a new parameter is required; an example of the name of this parameter is LINK_BEAM_FORM).

Thereafter, the MISF unit 22 of the neighboring PoA 20 reports the degraded link status or radio resource allocation status of the corresponding neighboring PoA 20 to the MISF unit 12 of the PoA 10 at step S109. An example of an existing MIES message used to report link status to the neighboring PoA 20 is MIH_Link_Parameters_Report indication. In order to report the radio resource allocation status of the neighboring PoA 20, a new MIES message is required. In connection with the present invention, MIS_Link_Resource_Report indication is proposed as the name of the corresponding message. The new message MIS_Link_Resource_Report indication may require the link ID of the neighboring PoA 20, and also a frequency band, transmission power, a time slot, and beamforming information which are radio resources used by the neighboring PoA 20, as its parameters.

Thereafter, the MISF unit 12 of the PoA 10 reports the degraded link status or radio resource allocation status of the neighboring PoA 20 to the MIS user unit 14 at step S110. An example of an existing MIES primitive used to report the link status of the neighboring PoA 20 is Link_Parameters_Report.indication. In order to report the radio resource allocation status of the neighboring PoA 20, a new MIES primitive is required. In connection with the present invention, Link_Resource_Report.indication is proposed as the name of the corresponding primitive. The new primitive Link_Resource_Report.indication may require the link ID of the neighboring PoA 20, and also a frequency band, transmission power, a time slot, and beamforming information which are radio resources used by the neighboring PoA 20.

The MIS user unit 14 of the PoA 10 determines new radio resource R2 based on the reported link status or radio resource allocation status of the neighboring PoA 20 at step S111.

Figure 9:
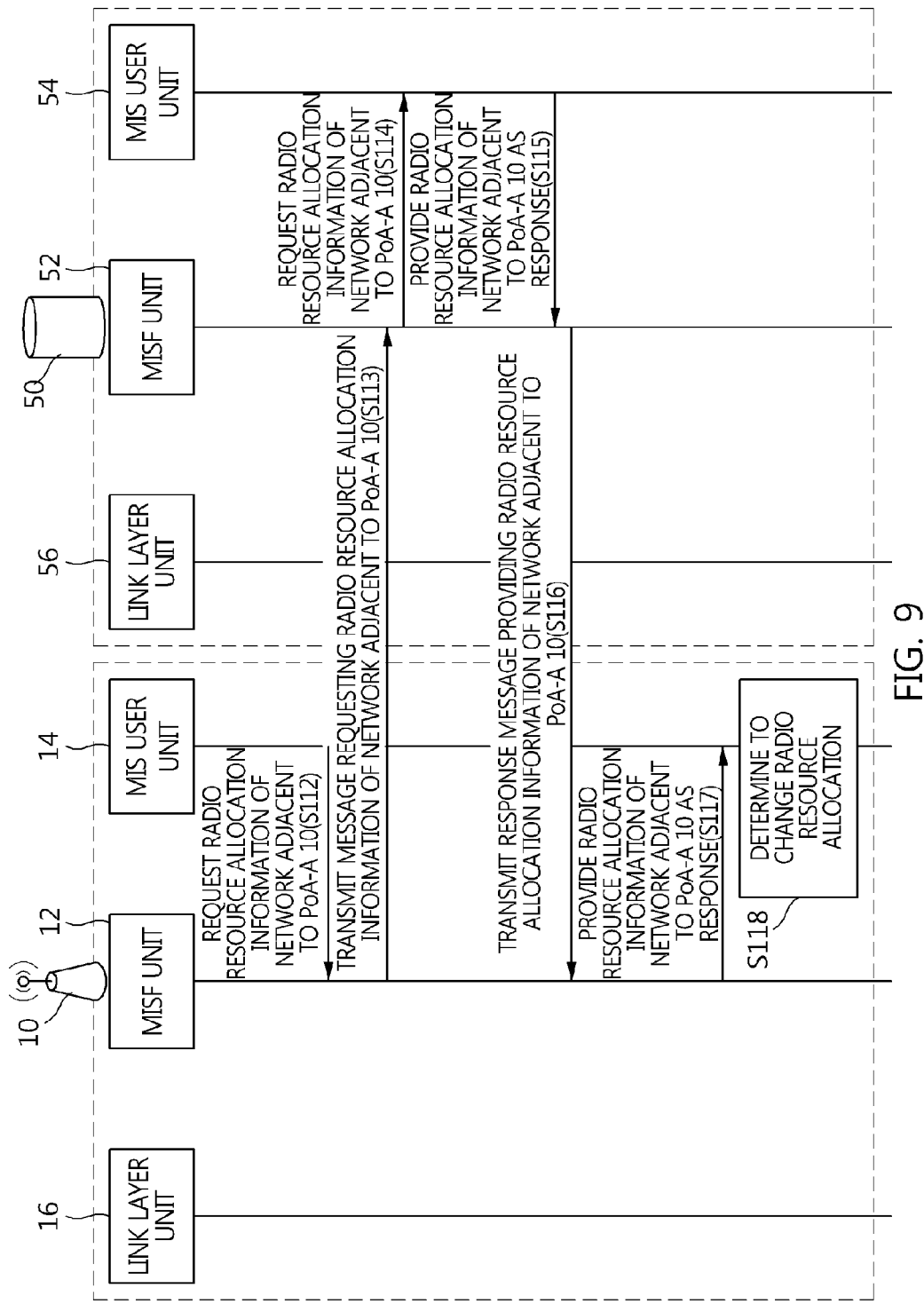

FIG. 9 illustrates the case where the PoA 10 determines radio resource allocation through the exchange of information with the network configuration information server 50. That is, the PoA 10 may determine its own radio resource allocation based on the radio resource allocation information of an adjacent network (for example, a PoA, such as an access point of a WLAN) ascertained by inquiring of the network configuration information server 50. If the neighboring PoA 20 adjacent to the PoA 10 is allocated the same radio resource R1 as the PoA 10, the performance of the PoA 10 may be deteriorated. Accordingly, the PoA 10 changes its radio resource allocation to new radio resource R2, thereby improving transmission efficiency (for example, transmission speed, delay time, etc.).

First, the MIS user unit 14 of the PoA 10 may request adjacent network radio resource allocation information from the MISF unit 12 at step S112. For this step, a new MIIS primitive used to become aware of network configuration information is required. In connection with the present invention, MIS_Get_Resource_Information.request is proposed as the name of the new MIIS primitive. The parameters of the new primitive may include the location information (QUERIER_LOC of the IEEE 802.21-2008 standard) of the PoA 10 and an adjacent network range (for which a new parameter is required; an example of this parameter is the distance from the PoA 10; the name of this parameter is QUERIER_RANGE).

Thereafter, the MISF unit 12 of the PoA 10 may request the radio resource allocation information of a network adjacent to the corresponding PoA 10 from the MISF unit 52 of the network configuration information server 50 at step S113. For this step, a new MIIS message used to become aware of the network configuration information is required. In connection with the present invention, an MIS_Get_Resource_Information request is proposed as the name of the new MIIS message. The parameters of this new message may include the ID of the MISF unit 12 of the PoA 10 (the MIHF ID of the IEEE 802.21-2008 standard), the location information of the PoA 10, an adjacent network range, etc.

Thereafter, the MISF unit 52 of the network configuration information server 50 may request the radio resource allocation information of the adjacent network of the PoA 10 from the MIS user unit 54 at step S114. For this step, a new MIIS primitive used to become aware of the network configuration information is required. In connection with the present invention, the name of this new MIIS primitive may be MIS_Get_Resource_Information.request. The parameters of this new primitive may include the ID of the MISF unit 12 of the PoA 10, the location information of the PoA 10, an adjacent network range, etc.

Thereafter, the MIS user unit 54 of the network configuration information server 50 may provide the radio resource allocation information of the adjacent network of the PoA 10 to the MISF unit 52 as response information at step S115. For this step, a new MIIS primitive used to report the network configuration information is required. In connection with the present invention, the name of this new MIIS primitive may be MIS_Get_Resource_Information.confirm. The parameters of this new primitive may include the ID of an adjacent PoA (IE_PoA_IP_ADDR of the IEEE 802.21-2008 standard), information about radio resource allocated to the adjacent PoA (for example, a frequency band (for which a new parameter is required; the name of this parameter is IE_FREQ)), transmission power (for which a new parameter is required; the name of this parameter is IE_TX_POWER), a time slot (for which a new parameter is required; the name of this parameter is IE_TIME_SLOT), beamforming (for which a new parameter is required; the name of this parameter is IE_BEAM_FORM), etc.

Thereafter, the MISF unit 52 of the network configuration information server 50 transfers the radio resource allocation information of the adjacent network of the PoA 10 to the MISF unit 12 of the PoA 10 at step S116. For this step, a new MIIS message used to report the network configuration information is required. In connection with the present invention, MIS_Get_Resource_Information response is proposed as the name of the new MIIS message. The parameters of the new message may include the ID of an adjacent PoA, radio resource (for example, a frequency band, transmission power, a time slot, and beamforming) allocated to the adjacent PoA, etc.

Thereafter, the MISF unit 12 of the PoA 10 may transfer the radio resource allocation information of the adjacent network of the PoA 10 to the MIS user unit 14 as a response at step S117. For this step, a new MIIS primitive used to report radio resource allocation information is required. In connection with the present invention, the name of the new MIIS primitive name may be MIS_Get_Resource_Information.confirm. The parameters of this new primitive may include the ID of the adjacent PoA, and also a frequency band, transmission power, a time slot, and beamforming allocated to the adjacent PoA, etc.

Thereafter, the MIS user unit 14 of the PoA 10 may determine to change the radio resource allocation based on the reported radio resource allocation information of the adjacent network of the PoA 10 at step S118.

Figure 10:
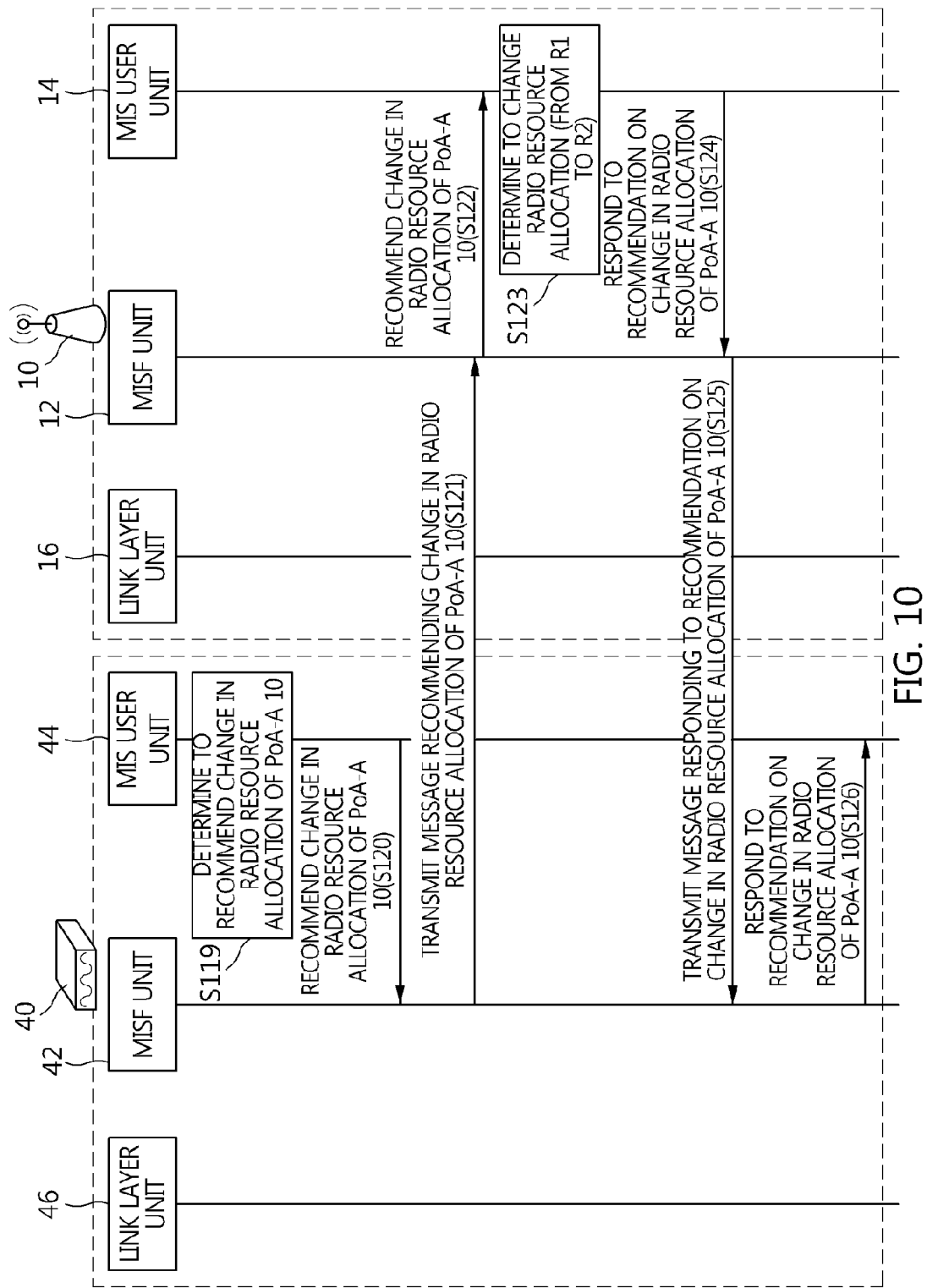

FIG. 10 illustrates the case where the PoA 10 determines radio resource allocation in response to the recommendation of the access controller 40 on a change in radio resource allocation. That is, when the access controller 40 determines to recommend a change in the radio resource allocation of the PoA 10 and then notifies the PoA 10 of radio resource to be allocated, the PoA 10 may determine to change the radio resource allocation.

First, the MIS user unit 44 of the access controller 40 determines to recommend a change in the radio resource allocation of the PoA 10 by determining that the radio resource allocation of the PoA 10 is required at step S119.

Thereafter, the MIS user unit 44 of the access controller 40 transfers a primitive commanding a recommendation on a change in the radio resource allocation of the PoA 10 to the MISF unit 42 at step S120. For this step, a new primitive is required, and the name of the primitive may be MIS_Resource_Recommend.request. The parameters of this new primitive may include the ID of the MISF unit 12 of the PoA 10, and information about radio resource (R2) (for example, a frequency band (an example of the name of this parameter is LINK_FREQ), transmission power (an example of the name of this parameter is LINK_TX_POWER), a time slot (an example of the name of this parameter is LINK_TIME_SLOT), and beamforming (an example of the name of this parameter is LINK_BEAM_FORM)) that will be recommended for a change.

Thereafter, the MISF unit 42 of the access controller 40 transfers a message commanding a recommendation on a change in the radio resource allocation of the PoA 10 to the MISF unit 12 at step S121. For this step, a new message is required, and the name of this message may be an MIS_Resource_Recommend request. The parameters of this new message may include the ID of the MISF unit 12 of the PoA 10, information about radio resource R2 (for example, a frequency band, transmission power, a time slot, and beamforming) that will be recommended for a change.

Thereafter, the MISF unit 12 of the PoA 10 transfers a primitive commanding a recommendation on a change in the radio resource allocation of the PoA 10 to the MIS user unit 14 at step S122. For this step, this primitive may be MIS_Resource_Recommend.request. The parameters of this primitive may include the ID of the MISF unit 12 of the PoA 10, and information about radio resource (R2) (for example, a frequency band, transmission power, a time slot, and beamforming) that will be recommended for a change.

Thereafter, the MIS user unit 14 of the PoA 10 determines to change radio resource allocation based on the radio resource R2 recommended by the access controller 40 at step S123.

Thereafter, the MIS user unit 14 of the PoA 10 transfers a primitive responding to the recommendation on a change in the radio resource allocation of the PoA 10 to the MISF unit 12 at step S124. For this step, a new primitive is required, and the name of this new primitive may be MIS_Resource_Recommend.response. The parameters of this new primitive may include the ID of the MISF unit 42 of the access controller 40 and information about whether the determination of the change in radio resource allocation has been accepted (STATUS of the IEEE 802.21-2008 document).

Thereafter, the MISF unit 12 of the PoA 10 transfers a message responding to the recommendation on a change in radio resource allocation to the MISF unit 42 of the access controller 40 at step S125. For this step, a new message is required, and the name of this new message may be an MIS_Resource_Recommend response. The parameters of this new message may include the ID of the MISF unit 42 of the access controller 40 and information about whether the determination of the change in radio resource allocation has been accepted.

Thereafter, the MISF unit 42 of the access controller 40 transfers a primitive responding to the recommendation on a change in the radio resource allocation of the PoA 10 to the MIS user unit 44 at step S126. For this step, the primitive may be MIS_Resource_Recommend.cofirm. The parameters of this primitive may include information about whether the determination of the change in radio resource allocation has been accepted.

Meanwhile, at step S100 of determining to change radio resource allocation, the access controller 40, rather than the PoA 10, may determine to change the radio resource allocation. That is, the access controller 40 may determine to change the radio resource allocation of the PoA 10 based on the link status or radio resource allocation status of PoAs (for example, the PoA 10 and/or the neighboring PoA 20) managed by itself and network configuration information. This is described in detail below with reference to the flowcharts of FIGS. 11 and 12.

Figure 11:
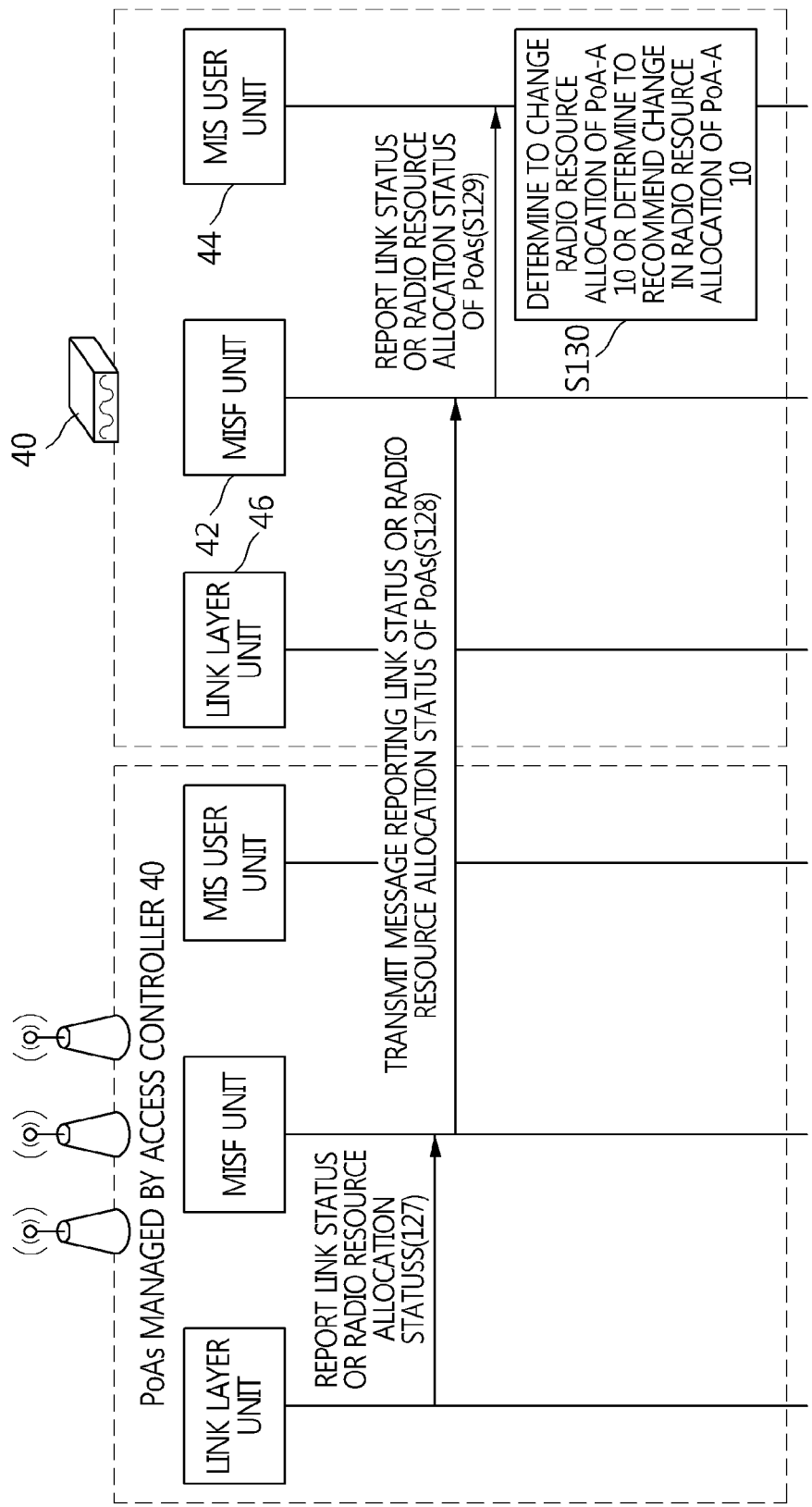

FIG. 11 illustrates the case where the access controller 40 determines to change the radio resource allocation of the PoA 10 based on the link status or radio resource allocation status of PoAs managed by itself. That is, the access controller 40 receives a report on the link status or radio resource allocation status of PoAs managed by itself, and determines to change or recommend a change in the radio resource allocation of the PoA 10 based on the received report. For example, when a PoA managed by the access controller 40 uses the same radio resource R1 as the PoA 10, the access controller 40 may determine to make the PoA 10 use another radio resource R2, or may determine to recommend the use of the radio resource R2 to the PoA 10.

First, the link layer units of the PoAs (for example, the PoA 10, and/or the neighboring PoA 20) managed by the access controller 40 report the link status and radio resource allocation status of the corresponding PoAs to the MISF units of the corresponding PoAs at step S127. In this case, an example of an existing MIES primitive used to report the link status of the PoAs is Link_Parameters_Report.indication. Furthermore, in order to report the radio resource allocation status of the PoAs, a new MIES primitive is used. Link_Resource_Report.indication may be used as this new MIES primitive. The new primitive Link_Resource_Report-.indication may require the link IDs of the PoAs and information about radio resource (for example, frequency bands, transmission power, time slots, and beamforming information) used by the PoAs.

Thereafter, the MISF units of the PoAs managed by the access controller 40 report the link status and radio resource allocation status of the PoAs to the MISF unit 42 of the access controller 40 at step S128. In this case, an example of an existing MIES message used to report the link status of the PoAs is a Link_Parameters_Report indication. In order to report the radio resource allocation status, a new MIES message is required. In an embodiment of the present invention, MIS_Link_Resource_Report indication may be used as the new MIES message. The new message MIS_Link_Resource_Report indication may require the link IDs of the PoAs and information about radio resource (for example, frequency bands, transmission power, time slots, and beamforming information) used by the PoAs.

Thereafter, the MISF unit 42 of the access controller 40 reports the link status or radio resource allocation status of the PoAs to the MIS user unit 44 at step S129. In this case, an example of an existing MIES primitive used to report the link status of the PoAs is MIH_Link_Parameters_Report-.indication. In order to report the radio resource allocation status of the PoAs, the new primitive MIS_Resource_Report.indication may be used. The new primitive MIS_Resource_Report.indication may require the link IDs of the PoAs and information about radio resource (for example, frequency bands, transmission power, time slots, and beamforming information) used by the PoAs.

Thereafter, the MIS user unit 44 of the access controller 40 determines to change the radio resource allocation of the PoA 10 or determines to recommend a change in the radio resource allocation of the PoA 10 based on the reported link status or radio resource allocation status of the PoAs at step S130. In this case, after the MIS user unit 44 has determined to recommend a change in the radio resource allocation of the PoA 10, a message recommending a change in the radio resource allocation may be transmitted to the PoA 10, as illustrated in FIG. 10.

Figure 12:
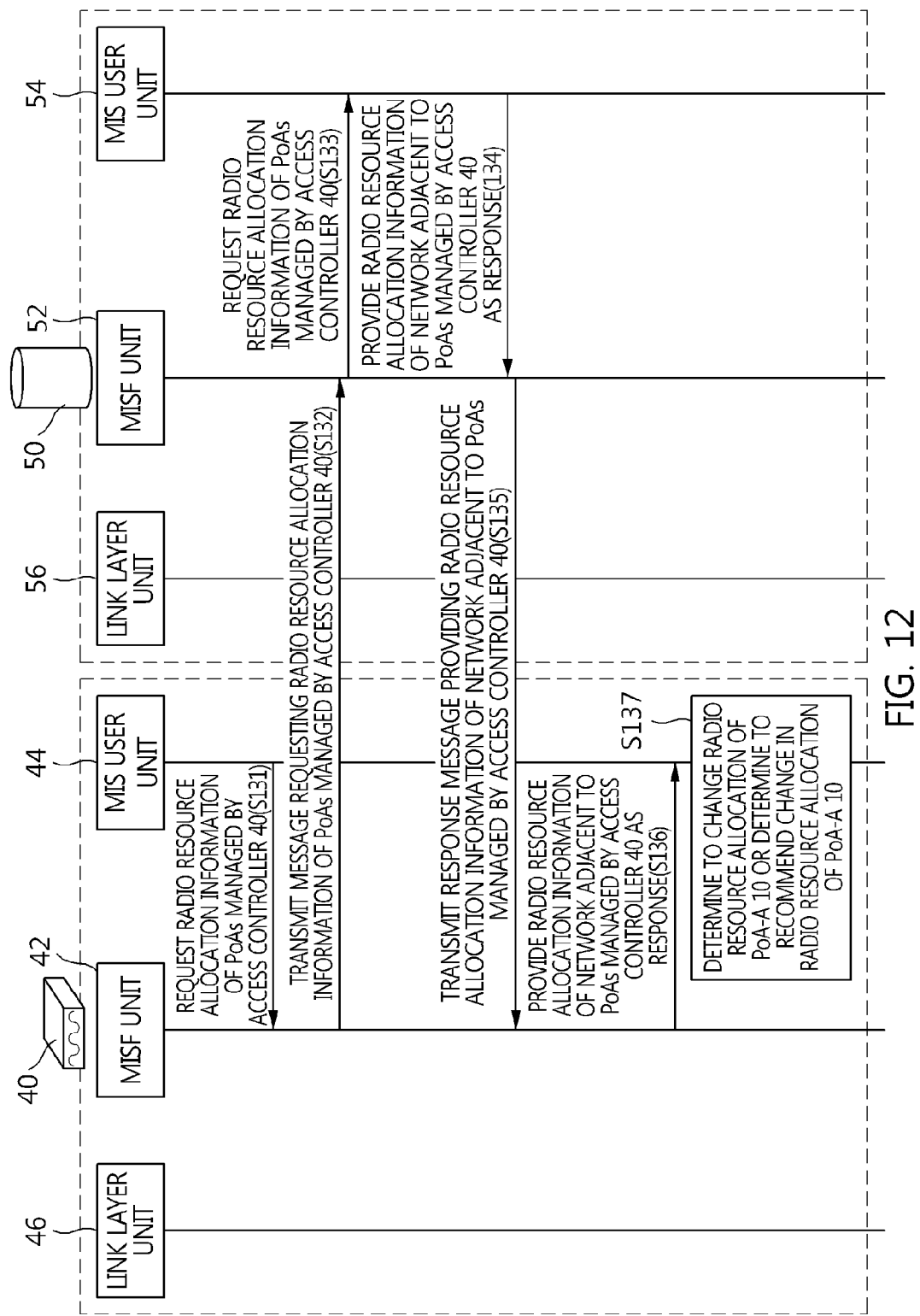

FIG. 12 illustrates the case where the access controller 40 determines the radio resource allocation of the PoA 10 through the exchange of information with the network configuration information server 50. That is, the access controller 40 may determine the radio resource allocation of the PoA 10 based on the radio resource allocation information of PoAs obtained in such a way that the corresponding access controller 40 inquires it of the network configuration information server 50. Although the access controller 40 may have the radio resource allocation information of PoAs managed by itself, the access controller 40 may obtain the radio resource allocation information of PoAs managed by itself from the network configuration information server 50 if the access controller 40 does not have the radio resource allocation information.

First, the MIS user unit 44 of the access controller 40 requests the radio resource allocation information of the PoAs managed by the access controller 40 from the MISF unit 42 at step S131. For this step, the new MIIS primitive MIS_Get_Resource_Information.request used to become aware of network configuration information is required. The parameter of this new primitive may include the IDs (the new ID QUERIER_POA_IP_ADDR) of the PoAs managed by the access controller 40.

Thereafter, the MISF unit 42 of the access controller 40 requests the radio resource allocation information of the PoAs managed by the access controller 40 from the MISF unit 52 of the network configuration information server 50 at step S132. For this step, a new MIIS message used to become aware of the network configuration information is required. In connection with the present invention, an MIS_Get_Resource_Information request is proposed as the name of this new MIIS message. The parameters of this new message may include the ID (the MIHF ID of the IEEE 802.21-2008 standard) of the MISF unit 42 of the access controller 40, and the IDs (the new ID QUERIER_POA_IP_ADDR) of the PoAs managed by the access controller 40.

Thereafter, the MISF unit 52 of the network configuration information server 50 requests adjacent network radio resource allocation information from the MIS user unit 54 at step S133. For this step, a new MIIS primitive used to become aware of the network configuration information is required. In connection with the present invention, the name of this new MIIS primitive may be MIS_Get_Resource_Information.request. The parameters of this new primitive may include the ID of the MISF unit 42 of the access controller 40 and the IDs of PoAs managed by the access controller 40.

Thereafter, the MIS user unit 54 of the network configuration information server 105 may transfer the radio resource allocation information of the PoAs managed by the access controller 40 to the MISF unit 52 as a response at step S134. For this step, a new MIIS primitive used to report the network configuration information is required. This new MIIS primitive may be MIS_Get_Resource_Information.confirm. The parameters of this new primitive may include the IDs (IE_POA_IP_ADDR of the IEEE 802.21-2008 standard) of the PoAs managed by the access controller 40, and information about radio resource (for example, frequency bands (the new parameter IE_FREQ is required), transmission power (a new parameter is required; the parameter IE_TX_POWER is required), time slots (the new parameter IE_TIME_SLOT is required), and beam-forming (the new parameter IE_BEAM_FORM is required)) allocated to the PoAs managed by the access controller 40.

Thereafter, the MISF unit 52 of the network configuration information server 50 transfers the radio resource allocation information of the PoAs managed by the access controller 40 to the MISF unit 42 of the access controller 40 as a response at step S135. For this step, a new MIIS message used to report the network configuration information is required. In connection with the present invention, an MIS_Get_Resource_Information response is proposed as the name of the new MIIS message. The parameters of the new message may include the IDs of the PoAs managed by the access controller 40, and information about radio resource (for example, frequency bands, transmission power, time slots, and beamforming) allocated to the adjacent PoAs.

Thereafter, the MISF unit 42 of the access controller 40 may transfer the radio resource allocation information of the PoAs managed by the access controller 40 to the MIS user unit 44 as a response at step S136. For this step, a new MIIS primitive used to report the network configuration information is required. In connection with the present invention, the name of this new MIIS primitive may be MIS_Get_Resource_Information.confirm. The parameters of this new primitive may include the IDs of the PoAs managed by the access controller 40, and information about radio resource (for example, frequency bands, transmission power, time slots, and beamforming) allocated to the PoAs.

Furthermore, the MIS user unit 44 of the access controller 40 determines to change radio resource allocation or determine to recommend a change in the radio resource allocation of the PoA 10 based on the radio resource allocation status of the PoAs managed by the access controller 40 at step S137. After having determined to recommend a change in the radio resource allocation of the PoA 10, the access controller 40 may transmit a message recommending a change in the radio resource allocation to the PoA 10, as illustrated in FIG. 10.

Meanwhile, referring back to FIG. 5, at step S200 of changing radio resource (for example, from R1 to R2) used for the connection of the terminal 30 to the PoA 10, the PoA 10 or the access controller 40 may command the terminal 30 to change radio resource for connection (that is, from the radio resource R1 to the radio resource R2) by using the existing radio resource R1. Accordingly, the terminal 30 changes the radio resource for connection (from R1 to R2). This is described in detail below with reference to the flowcharts of FIGS. 13 and 14.

Figure 13:
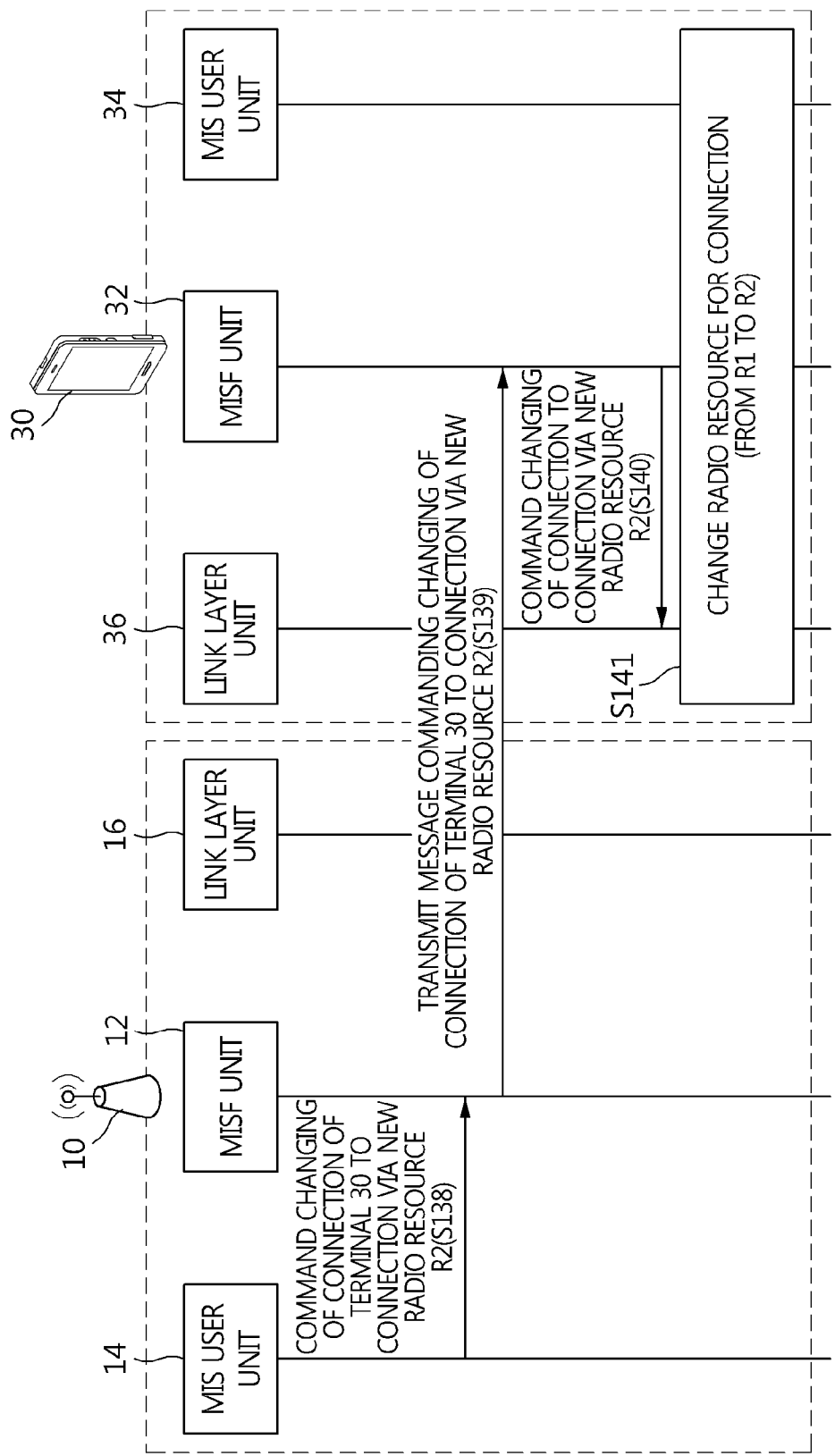
FIGS. 13 and 14 are diagrams illustrating the process of changing the connection of a terminal illustrated in FIG. 5.

FIG. 13 illustrates the case where the PoA 10 issues a terminal connection change command to the terminal 30. That is, the PoA 10 may command the terminal 30 to connect via the new radio resource R2 by using the existing radio resource R1. Accordingly, the terminal 30 may change the radio resource for connection (that is, from the radio resource R1 to the radio resource R2) in response to the command of the PoA 10. Preexisting handover technology may be used to reduce the time it takes to change the radio resource of the terminal 30.

First, the MIS user unit 14 of the PoA 10 transmits a message commanding the terminal 30 to connect via the new radio resource R2 to the MISF unit 12 at step S138. This message uses an MICS primitive. This MICS primitive is a new primitive, and the name of this new primitive may be MIS_Link_Connection.request. The parameters of this new primitive may include the ID of the MISF unit 32 of the terminal 30, the ID (LINK_ID of the IEEE 802.21 standard) of the link layer unit 36, and information about the new radio resource R2 (for example, a frequency band, transmission power, a time slot, and beamforming).

Thereafter, the MISF unit 12 of the PoA 10 transmits an MICS message, commanding the transmission of a message commanding the terminal 30 to connect via the new radio resource R2, to the MISF unit 32 of the terminal 30 at step S139. This message is a new message, and the name of this message may be an MIS_Link_Connection indication. This new message may be unicast to a single terminal, or may be multicast or broadcast to a plurality of terminals. The parameters of this new message may include the ID of the MISF unit 32 of the terminal 30, the ID of the link layer unit 36, and information about the new radio resource R2 (for example, a frequency band, transmission power, a time slot, and beamforming).

Thereafter, the MISF unit 32 of the terminal 30 transmits an MICS primitive commanding the link layer unit 36 of the terminal 30 to connect via the radio resource R2 to the link layer unit 16 at step S140. This MICS primitive is a new primitive, and the name of this new primitive may be Link_Connection.request. The parameter of this new primitive may include information about the new radio resource R2 (for example, a frequency band, transmission power, a time slot, and beamforming).

Thereafter, the link layer unit 36 of the terminal 30 changes its own radio resource at step S141. The link layer unit 36 of the terminal 30 may notify the MIS user unit 34 of the terminal 30 of the new radio resource.

Figure 14:
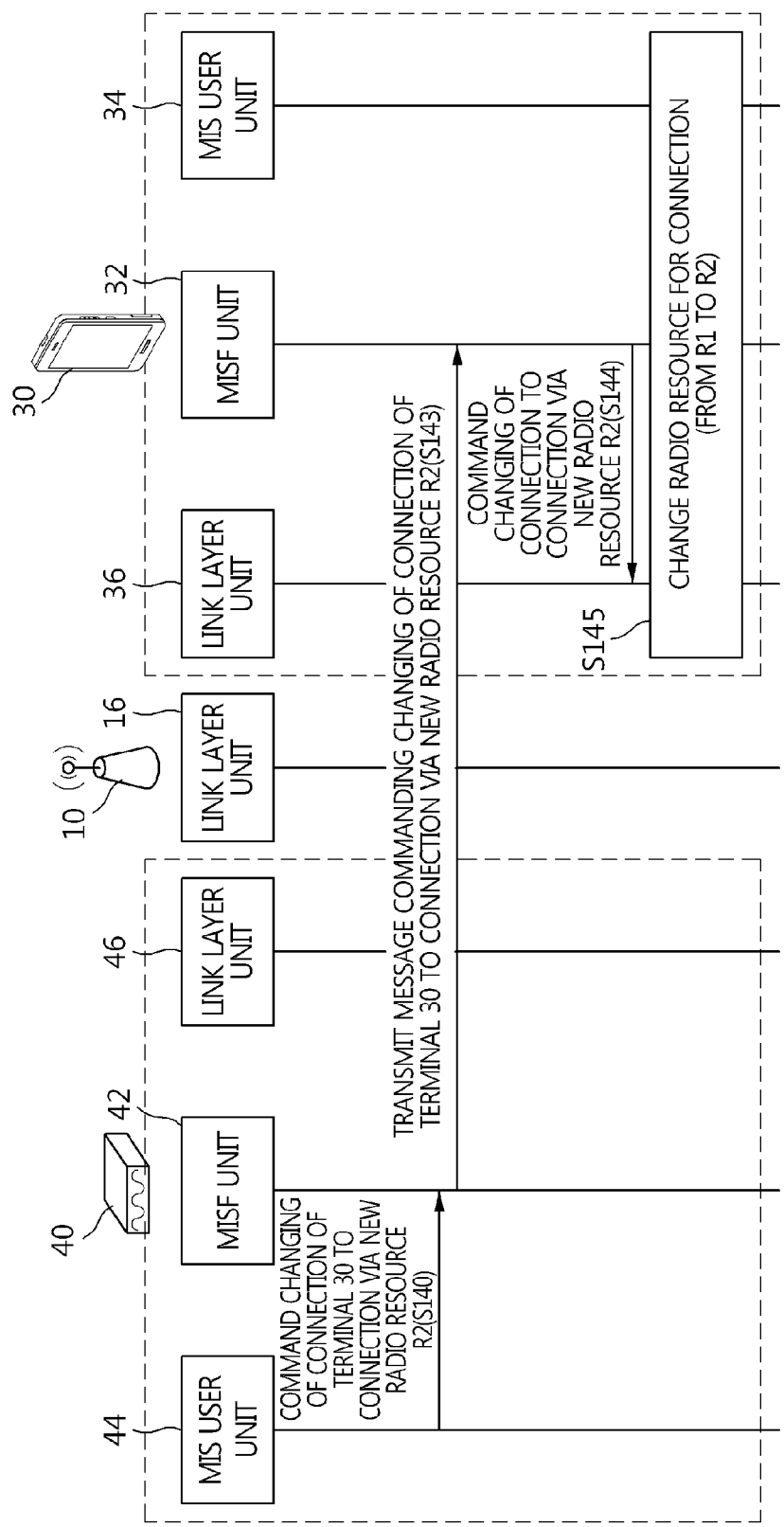

FIG. 14 illustrates the case where the access controller 40 provides a terminal connection change command to the terminal 30. That is, the access controller 40 may command the terminal 30 to connect via the new radio resource R2 by using the radio resource R1 used before the radio resource of the PoA 10 are changed. Accordingly, the terminal 30 may change its own radio resource in response to a command from the access controller 40. In the present invention, it is assumed that the access controller 40 may connect with the terminal 30 that connects with the PoA 10 managed by itself.

First, the MIS user unit 44 of the access controller 40 transmits an MICS primitive, commanding transmission of a message commanding the terminal 30 to connect via the new radio resource R2, to the MISF unit 42 at step S142. This MICS primitive is a new primitive, and the name of this primitive may be MIS_Link_Connection.request. The parameters of this MICS primitive may include the ID of the MISF unit 32 of the terminal 30, the ID of the link layer unit 36 (LINK_ID of the IEEE 802.21 standard), and information about the new radio resource R2 (for example, a frequency band, transmission power, a time slot, and beamforming).

Thereafter, the MISF unit 42 of the access controller 40 transmits an MICS message, commanding the terminal 30 to connect via the new radio resource R2, to the MISF unit 32 of the terminal 30 via the PoA 10 at step S143. This MICS message is a new message, and the name of this MICS message may be an MIS_Link_Connection indication. This MICS message may be unicast to a single terminal, and may be multicast or broadcast to a plurality of terminals. The parameters of this MICS message may include the ID of the MISF unit 32 of the terminal 30, the ID of the link layer unit 36, and information about the new radio resource R2 (for example, a frequency band, transmission power, a time slot, and beamforming).

Thereafter, the MISF unit 32 of the terminal 30 transmits an MICS primitive, commanding connection via the radio resource R2, to the link layer unit 36 at step S144. This MICS primitive is a new primitive, and the name of this MICS primitive may be Link_Connection.request. The parameters of this MICS primitive may include information about the new radio resource R2 (for example, a frequency band, transmission power, a time slot, and beamforming).

Thereafter, the link layer unit 36 of the terminal 30 changes its own radio resource at step S145. The link layer unit 36 of the terminal 30 may notify the MIS user unit 34 of the terminal 30 of the new radio resource.

Meanwhile, referring back to FIG. 5, at step S300 of changing radio resource allocation and reporting the new radio resource allocation, the PoA 10 or the access controller 40 may command the link layer of the PoA to change radio resource allocation (that is, from the radio resource R1 to the radio resource R2). Accordingly, once the radio resource allocation of the link layer of the PoA 10 has been changed, the PoA 10 may report the radio resource R2 to adjacent network devices (for example, the neighboring PoA 20, the access controller 40, and the network configuration information server 50). In this case, the access controller 40 may distribute the data traffic of the terminal 30 using a plurality of PoAs if necessary. If necessary, the PoA 10 may distribute the data traffic of the terminal 30 using a plurality of link layers based on different communication technologies. This is described in detail below with reference to the flowcharts of FIGS. 15 to 18.

Figure 15:
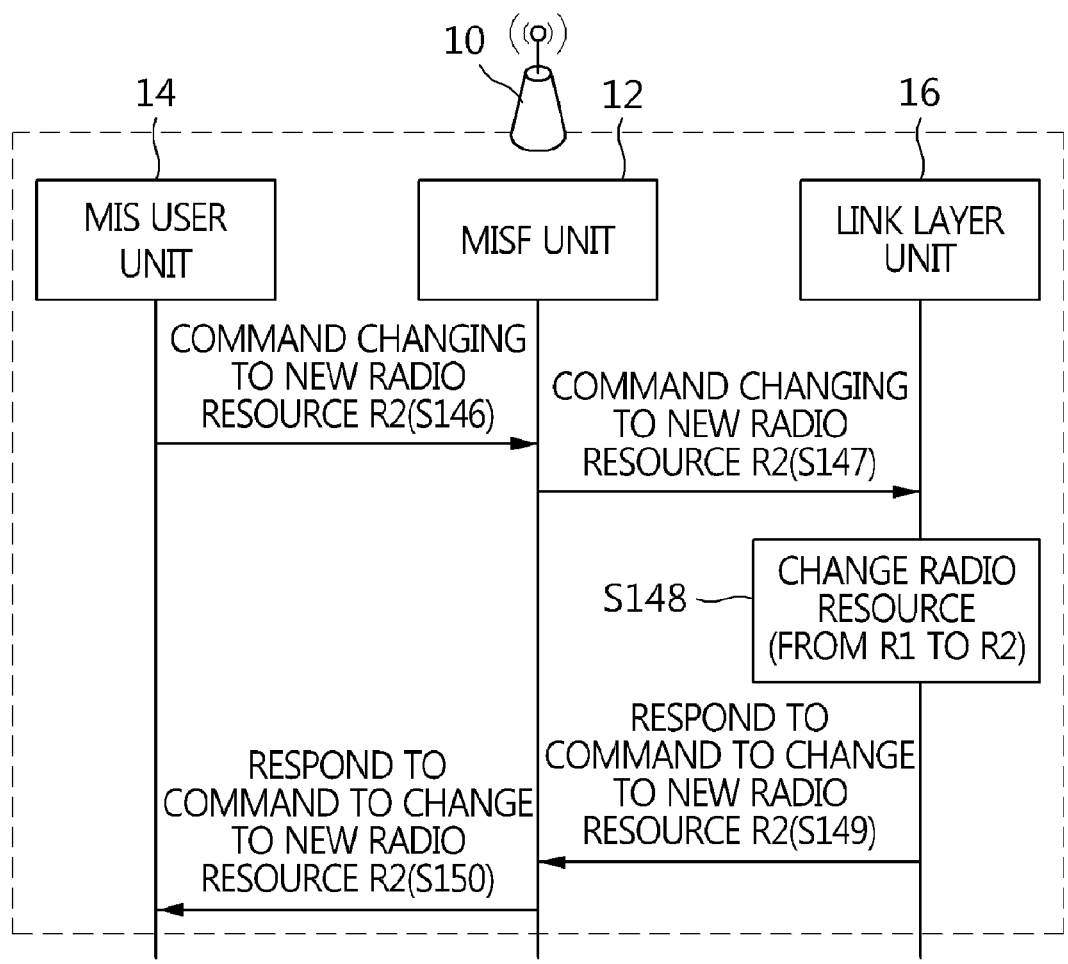
FIGS. 15 to 18 are diagrams illustrating the process of changing radio resource allocation and making a report illustrated in FIG. 5.

FIG. 15 illustrates the case where the PoA 10 changes radio resource allocation on its own. That is, when the PoA 10 changes radio resource allocation, the MIS user unit 14 of the PoA 10 may change radio resource allocation by commanding a change in radio resource allocation.

First, the MIS user unit 14 of the PoA 10 may command the MISF unit 12 to change radio resource (that is, from the radio resource R1 to the radio resource R2) by using an MICS primitive at step S146. In this case, a new primitive is required, and the name of this new MICS primitive may be MIS_Resource_Allocation.request. The parameters of the new primitive may include the ID of a link layer (which may be the link layer unit 16), and information about the radio resource R2 (for example, a frequency band, transmission power, a time slot, and beamforming).

Thereafter, the MISF unit 12 of the PoA 10 may command the link layer unit 16 to change radio resource (that is, from the radio resource R1 to the radio resource R2) by using an MICS primitive at step S147. In this case, a new primitive is required, and the name of this new primitive may be LINK_Resource_Allocation.request. The parameters of the new primitive may include information about the radio resource R2 (for example, a frequency band, transmission power, a time slot, and beamforming).

Thereafter, the link layer unit 16 of the PoA 10 may change the radio resource of the link layer (that is, from the radio resource R1 to the radio resource R2) based on the radio resource change command at step S148.

Thereafter, the link layer unit 16 of the PoA 10 may transfer information about whether the radio resource have been changed to the MISF unit 12 by using an MICS primitive at step S149. In this case, a new primitive is required, and the name of this new primitive may be LINK_Resource_Allocation.confirm. The parameter of this new primitive may include information about whether the radio resource have been changed (for which STATUS of the IEEE 802.21-2008 standard may be needed).

Thereafter, the MISF unit 12 of the PoA 10 may transfer information about whether the radio resource have been changed to the MIS user unit 14 as a response by using an MICS primitive at step S150. In this case, a new primitive is required, and the name of this new primitive may be MIS_Resource_Allocation.confirm. The parameters of this new primitive may include the ID of the link layer unit 16, and information whether the radio resource have been changed.

Figure 16:
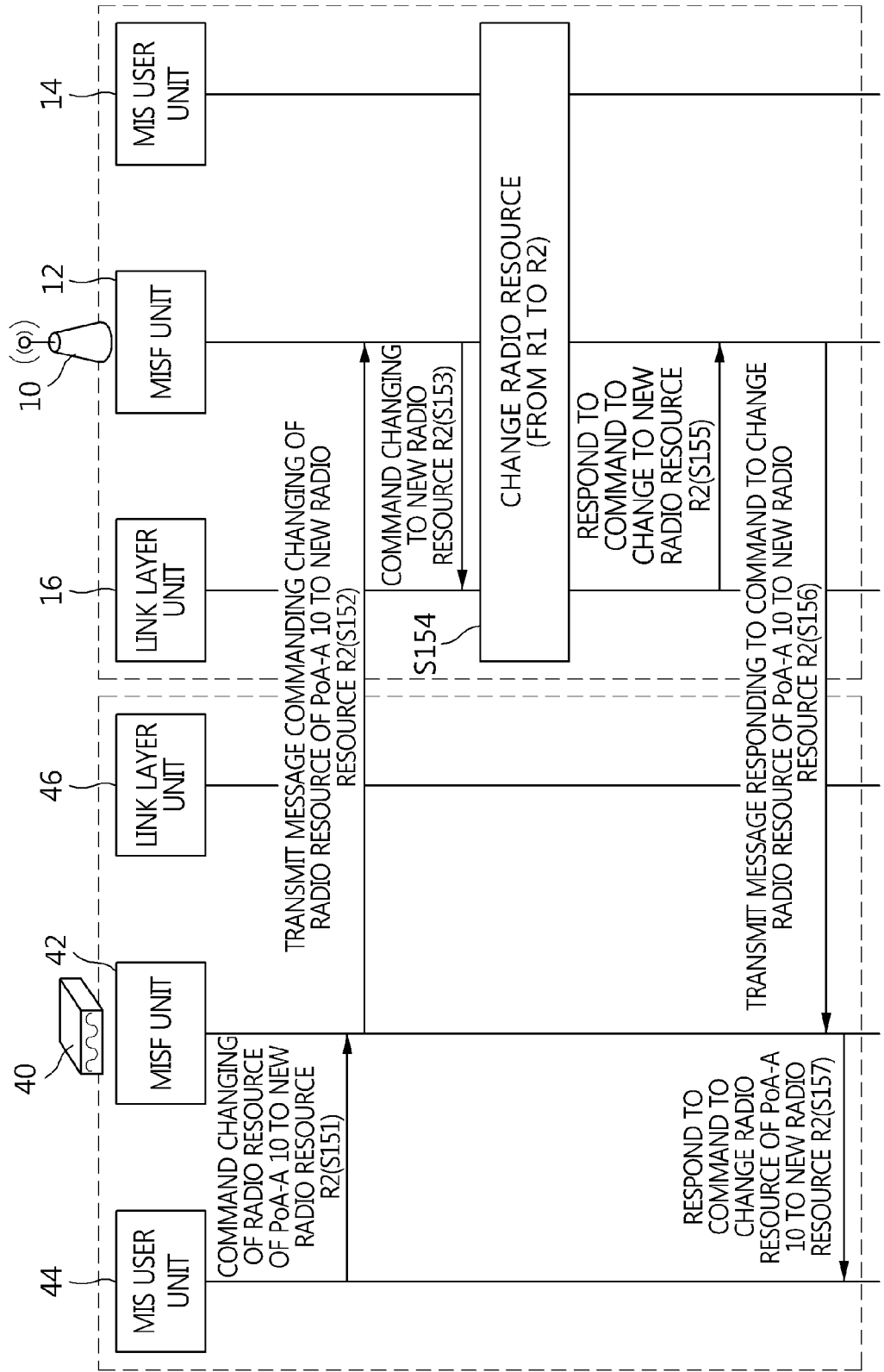

FIG. 16 illustrates the case where the access controller 40 transmits a radio resource allocation change command to the PoA 10. That is, the access controller 40 may change the radio resource allocation of the PoA 10 by commanding a change in the radio resource allocation of the PoA 10 (that is, from the radio resource R1 to the radio resource R2).

First, the MIS user unit 44 of the access controller 40 may command the MISF unit 42 to change the radio resource of the PoA 10 (that is, from the radio resource R1 to the radio resource R2) by using an MICS primitive at step S151. In this case, a new primitive is required, and the name of this new primitive may be MIS_Resource_Allocation.request. The parameters of this new primitive may include the ID of the PoA 10, the ID of the link layer (which may be the link layer unit 16) of the PoA 10, and information about the radio resource R2 (for example, a frequency band, transmission power, a time slot, and beamforming).

Thereafter, the MISF unit 42 of the access controller 40 may command a change in the radio resource of the PoA 10 (that is, from the radio resource R1 to the radio resource R2) by transmitting an MICS message to the MISF unit 12 of the PoA 10 at step S152. In this case, a new message is required, and the name of this new message may be MIS_Resource_Allocation request. The parameters of this new message may include the ID of the PoA 10, the ID of the link layer (which may be the link layer unit 16) of the PoA 10, and information about the radio resource R2 (for example, a frequency band, transmission power, a time slot, and beamforming).

Thereafter, the MISF unit 12 of the PoA 10 may command the link layer unit 16 to change radio resource (that is, from the radio resource R1 to the radio resource R2) by using an MICS primitive at step S153. In this case, a new primitive is required, and the name of this new primitive may be LINK_Resource_Allocation.request. The parameters of this new primitive may include information about the radio resource R2 (for example, a frequency band, transmission power, a time slot, and beamforming).

Thereafter, the link layer unit 16 of the PoA 10 may change the radio resource of the link layer (that is, from the radio resource R1 to the radio resource R2) based on the radio resource change command at step S154. In this case, once the radio resource of the link layer of the PoA 10 have been changed, the link layer unit 16 of the PoA 10 may report to the MIS-user unit 14 of the PoA 10 that the radio resource of the link layer have been changed. Furthermore, in order to report that the radio resource of the link layer of the PoA 10 have been changed, MIS_Resource_Report.indication, which has been defined above, may be used.

Thereafter, the link layer unit 16 of the PoA 10 may transfer information about whether the radio resource have been changed to the MISF unit 12 as a response by using an MICS primitive at step S155. In this case, a new primitive is required, and the name of this new primitive may be LINK_Resource_Allocation.confirm. The parameter of this new primitive may include information about whether the radio resource have been changed.

Thereafter, the MISF unit 12 of the PoA 10 may transfer information about whether the radio resource have been changed to the MISF unit 42 of the access controller 40 as a response by using an MICS message at step S156. In this case, a new message is required, and the name of this new message may be MIS_Resource_Allocation response. The parameters of this new message may include the ID of the PoA 10, the ID of the link layer (which may be the link layer unit 16) of the PoA 10, and information about whether the radio resource have been changed.

Thereafter, the MISF unit 42 of the access controller 40 may transfer information about whether the radio resource of the PoA 10 have been changed to the MIS user unit 44 as a response by using an MICS primitive at step S157. In this case, a new primitive is required, and the name of this new primitive may be MIS_Resource_Allocation.confirm. The parameters of this new primitive may include the ID of the PoA 10, the ID of the link layer (which may be the link layer unit 16) of the PoA 10, and information about whether the radio resource have been changed.

Figure 17:
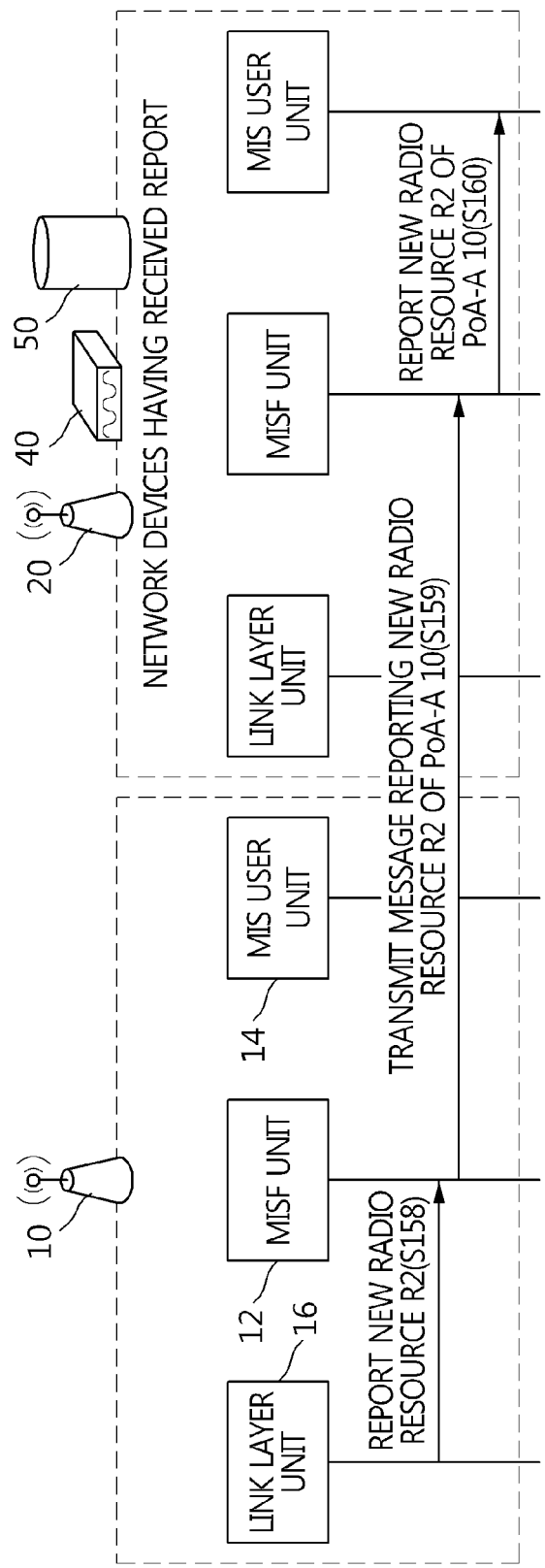

FIG. 17 illustrates the case of reporting the new radio resource of the PoA 10 (a notification scheme). That is, the PoA 10 notifies an adjacent PoA (for example, the neighboring PoA 20), the access controller 40, and the network configuration information server 50 that the radio resource have been changed, and may receive no separate response messages from them.

First, the link layer unit 16 of the PoA 10 transmits a primitive, requesting the transmission of a message reporting the new radio resource R2, to the MISF unit 12 at step S158. In this case, the corresponding primitive may be Link_Resource_Report.indication, which has been defined above. Accordingly, the parameters required by this new primitive may include the ID of the link layer (which may be the link layer unit 16) of the PoA 10, and information about the radio resource (for example, a frequency band, transmission power, a time slot, and beamforming) of the PoA 10.

Thereafter, the MISF unit 12 of the PoA 10 transmits a message, reporting the new radio resource R2, to the MISF units of network devices (for example, the neighboring PoA 20, the access controller 40, and the network configuration information server 50) that will receive a report at step S159. In this case, the corresponding message may be MIS_Resource_Report indication, which has been defined above. The parameters of this new message may include the ID of the PoA 10, the ID of the link layer (which may be the link layer unit 16) of the PoA 10, and information about radio resource (for example, a frequency band, transmission power, a time slot, and beamforming) used by the PoA 10.

Thereafter, the MISF units of the network devices (for example, the neighboring PoA 20, the access controller 40, and the network configuration information server 50) that will receive a report transmit a primitive reporting the new radio resource R2 of the PoA 10 to the MIS user units of the corresponding network devices at step S160. In this case, the primitive reporting the new radio resource R2 may be MIS_Resource_Report.indication, which has been defined above. The parameters required for this new primitive may include the ID of the PoA 10, the ID of the link layer (which may be the link layer unit 16) of the PoA 10, and information about radio resource (for example, a frequency band, transmission power, a time slot, and beamforming) used by the PoA 10.

Figure 18:
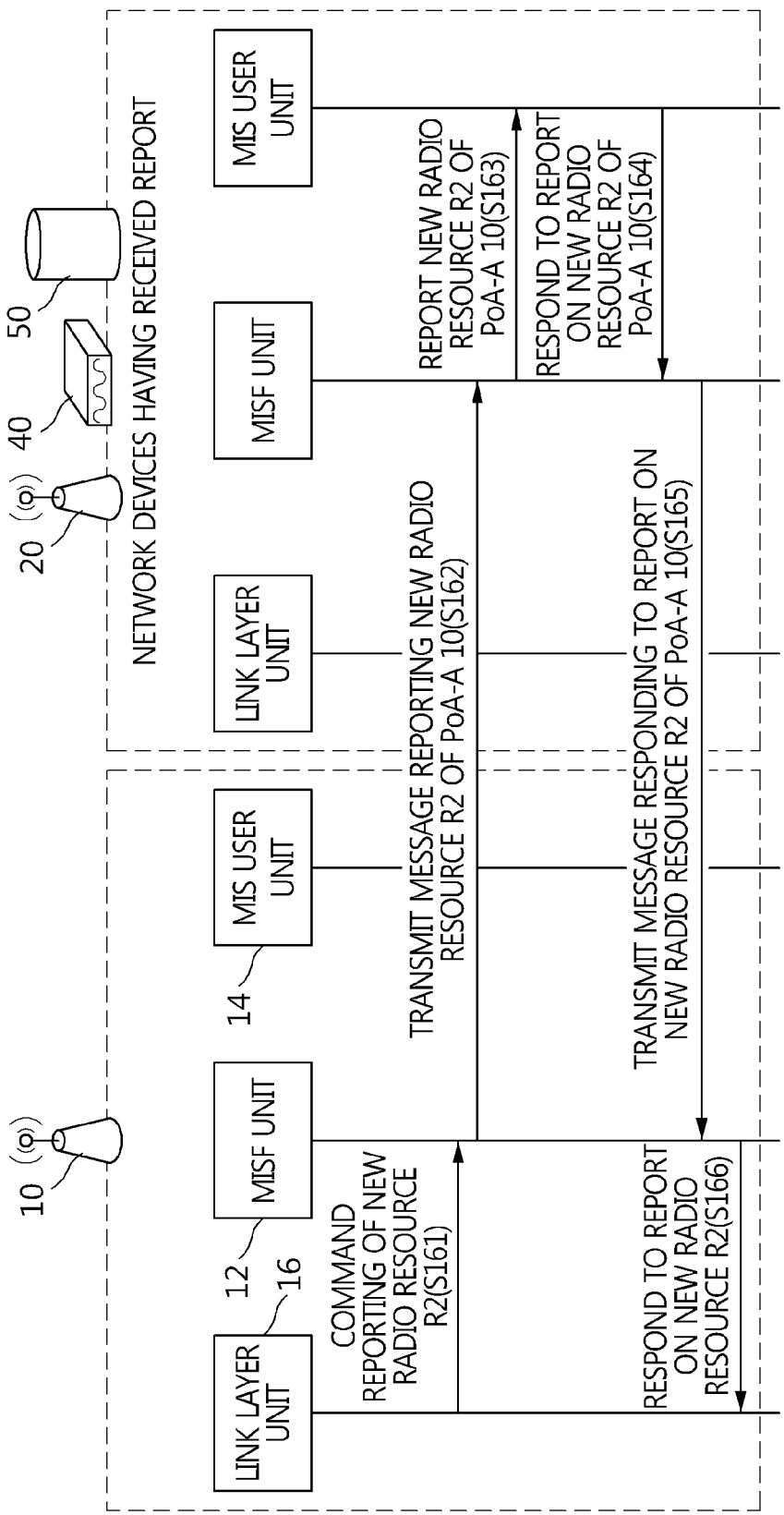

FIG. 18 illustrates the case of reporting the new radio resource of the PoA 10 (a report-response scheme). That is, the PoA 10 may notify adjacent PoAs (for example, the neighboring PoA 20), the access controller 40, and the network configuration information server 50 that radio resource have been changed, and may receive separate response messages from them.

First, the link layer unit 16 of the PoA 10 transmits a primitive requesting the transmission of a message reporting the new radio resource R2 to the MISF unit 12 at step S161. In this case, the corresponding primitive may be Link_Resource_Report.indication, which has been defined above. The parameters required for the new primitive may include the ID of the link layer (which may be the link layer unit 16) of the PoA 10, and information about radio resource (for example, a frequency band, transmission power, a time slot, and beamforming) used by the PoA 10.

Thereafter, the MISF unit 12 of the PoA 10 transmits a message reporting the new radio resource R2 to the MISF unit of the network devices (for example, the neighboring PoA 20, the access controller 40, and the network configuration information server 50) that will receive a report at step S162. In this case, the corresponding message may be an MIS_Resource_Report request, which has been defined above. The parameters of this new message may include the ID of the PoA 10, the ID of the link layer (which may be the link layer unit 16) of the PoA 10, and information about radio resource (for example, a frequency band, transmission power, a time slot, and beamforming) used by the PoA 10.

Thereafter, the MISF units of the network devices that have received a report transmit a primitive reporting the new radio resource R2 of the PoA 10 to the MIS user units of the corresponding network devices at step S163. In this case, the primitive used to report the new radio resource R2 may be MIS_Resource_Report.indication, which has been defined above. The parameters required for this new primitive may include the ID of the PoA 10, the ID of the link layer (which may be the link layer unit 16) of the PoA 10, and information about radio resource (for example, a frequency band, transmission power, a time slot, and beamforming) used by the PoA 10.

Thereafter, the MIS user units of the network devices that have received a report transmit a response primitive responding to the report on the new radio resource R2 of the PoA 10 to the MISF units of the corresponding network devices at step S164. In this case, the corresponding primitive may be MIS_Resource_Report.response. The parameters required for this new primitive may include the ID of the PoA 10, the ID of the link layer (which may be the link layer unit 16) of the PoA 10, and information whether the network devices that have received the report have checked the report on the new radio resource (STATUS of the IEEE 802.21-2008 document).

Thereafter, the MISF units of the network devices that have received the report transmit a response message responding to the report on the new radio resource R2 of the PoA 10 to the MISF unit 12 of the PoA 10 at step S165. In this case, the corresponding message may be MIS_Resource_Report response. The parameters required for this new message may include the ID of the PoA 10, the ID of the link layer (which may be the link layer unit 16) of the PoA 10, and information whether the network devices that have received the report have checked the report on the new radio resource.

Thereafter, the MISF unit 12 of the PoA 10 transmits a response primitive responding to the report on the new radio resource R2 to the link layer unit 16 at step S166. In this case, the corresponding primitive may be Link_Resource_Report.response. The parameters required for this new message may include information whether the network devices that have received the report have checked the report on the new radio resource.

Figure 19:
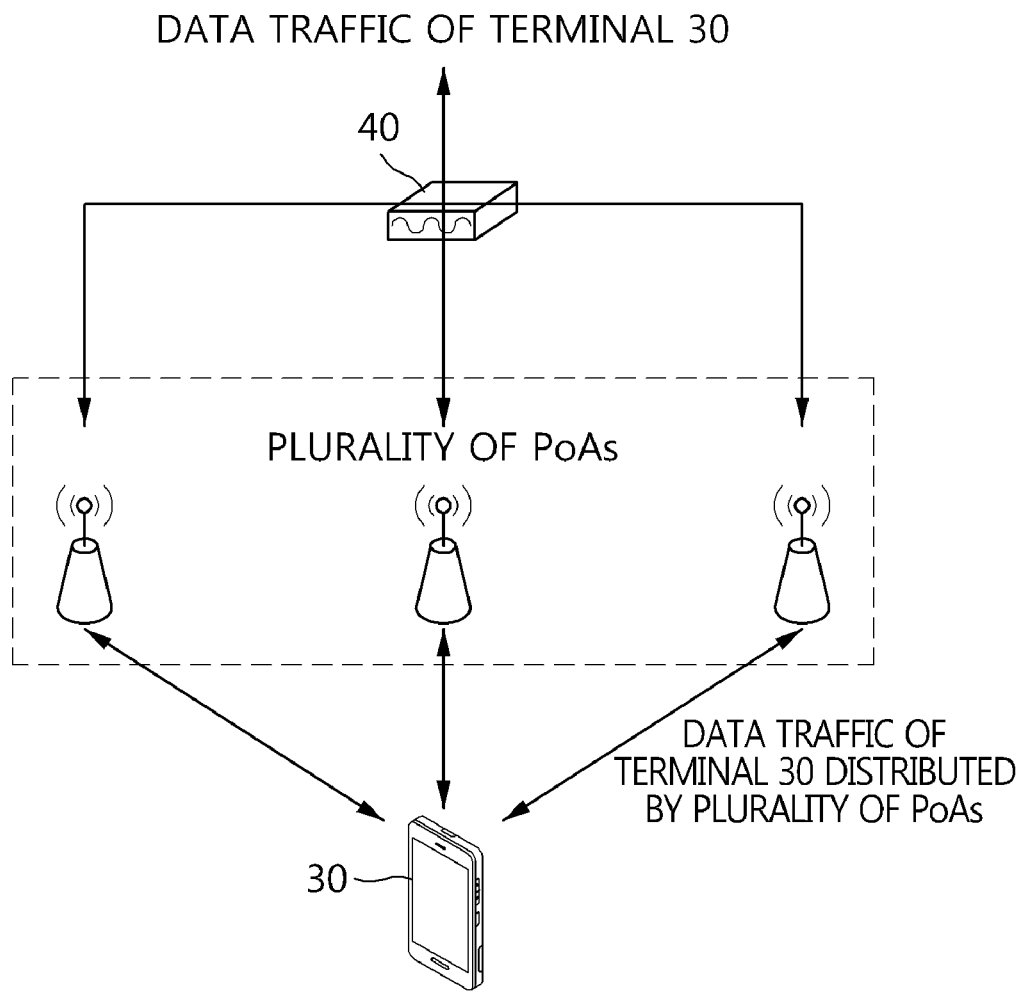
FIG. 19 illustrates a first application example of the present invention.

FIG. 19 illustrates a first application example of the present invention.

The access controller 40 may distribute the data traffic of the terminal 30 among a plurality of PoAs in order to maximize the efficiency of radio resource.

When the data traffic of the terminal 30 is distributed among a plurality of PoAs as described above, any one of the radio resource allocation methods corresponding to the above-described FIGS. 3 to 18 may be applied to each of the plurality of PoAs.

Meanwhile, a plurality of PoAs may use different communication technologies. For example, a PoA may use LTE technology, whereas another PoA may use WLAN technology.

Figure 20:
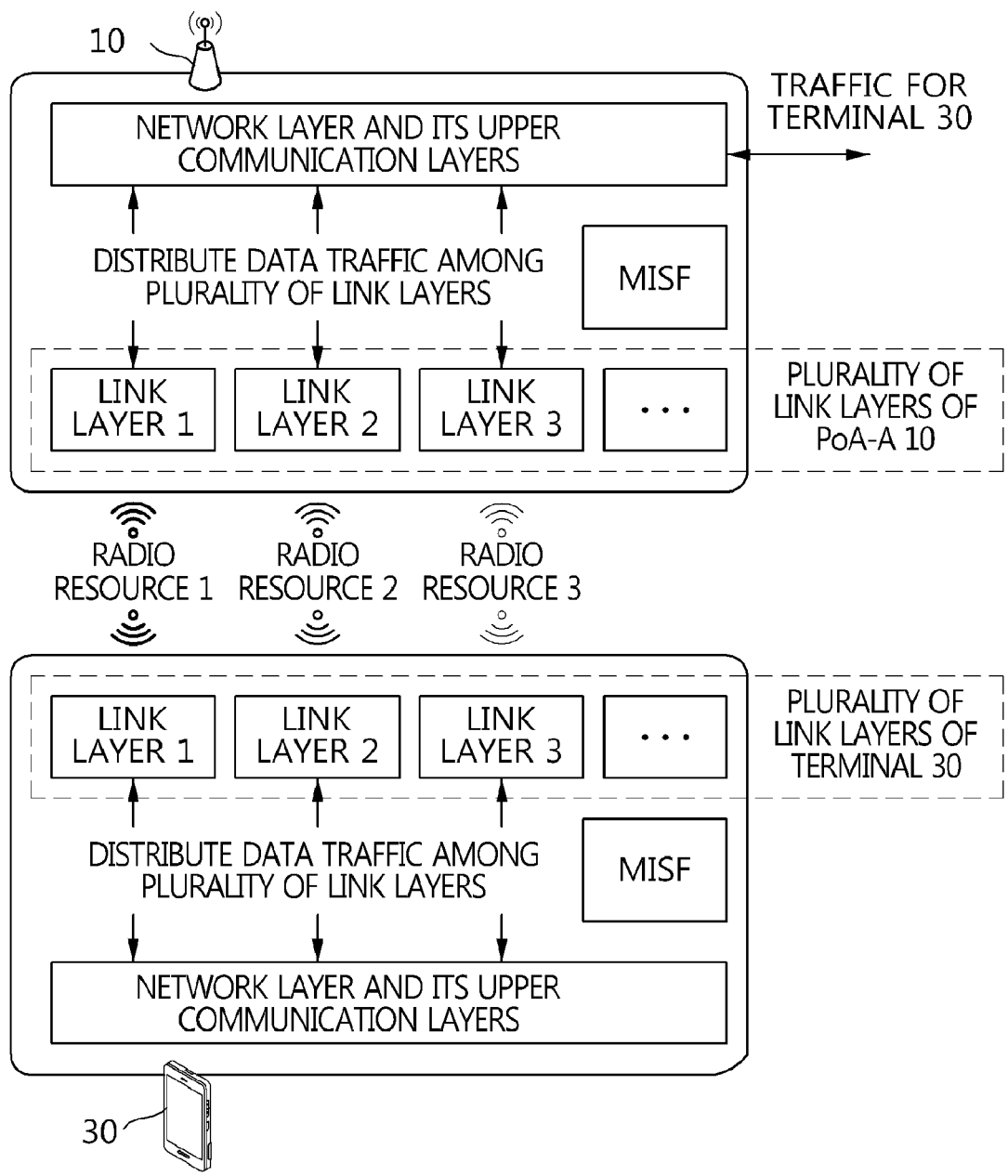
FIG. 20 illustrates a second application example of the present invention.

FIG. 20 illustrates a second application example of the present invention.

The PoA 10 may distribute the data traffic of the terminal 30 among the plurality of link layers of the PoA 10 in order to maximize the efficiency of radio resource. In this case, the radio resource allocation of each of the plurality of link layers of the PoA 10 may be performed using any one of the radio resource allocation methods corresponding to the above-described FIGS. 3 to 19.

The terminal 30 distributes the distributed data traffic using the plurality of link layers of the terminal 30. In this case, the radio resource allocation of each of the plurality of link layers 36 of the terminal 30 may be performed using any one of the radio resource allocation methods corresponding to the above-described FIGS. 3 to 19.

Meanwhile, the link layers of the PoA 10 and the terminal 30 may use different communication technologies. For example, a link layer (for example, a link layer 1) may use LTE technology, whereas another link layer (for example, a link layer 2) may use WLAN technology.

At least one embodiment of the present invention has the advantage of enabling the dynamic radio resource control of the link layers of MIS framework-based heterogeneous networks, thereby reducing interference between heterogeneous networks.

Furthermore, at least one embodiment of the present invention has the advantage of maximizing transmission efficiency when radio resource are used.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. A method of managing radio resources, comprising:
   determining, by a Point of Attachment (PoA) managing radio resource of link layers of heterogeneous networks based on a media independent services (MIS) framework or by an access controller communicating with the PoA, to change radio resource to be allocated to the PoA;
   commanding, by the PoA or by the access controller, a terminal to connect via new radio resource by using current radio resource;
   changing, by the PoA, the radio resource of the PoA based on a radio resource change command from the PoA or the access controller;
   receiving, by the PoA, any one of:
      one or more of link status and radio resource allocation status of a neighboring PoA from the neighboring PoA;
      radio resource allocation information of an adjacent network from a network configuration in server; and
      a recommendation on a change in radio resources from the access controller; and
   reporting, by the PoA, the new radio resource to network devices adjacent to the PoA comprising the neighboring PoA, the network configuration information server, and the access controller.

2. The method of claim 1, wherein determining to change the radio resource to be allocated to the PoA comprises performing, by the PoA, the determination based on its own link status.

3. The method of claim 1, wherein determining to change the radio resource to be allocated to the PoA comprises performing, by the PoA, the determination based on link status of the terminal.

4. The method of claim 1, wherein determining to change the radio resource to be allocated to the PoA comprises performing, by the PoA, the determination based on the one or more of link status and the radio resource allocation status of the neighboring PoA.

5. The method of claim 1, wherein determining to change the radio resource to be allocated to the PoA comprises performing, by the PoA, the determination based on the radio resource allocation information of the adjacent network obtained by inquiring the radio resource allocation information of the adjacent network of the network configuration information server.

6. The method of claim 1, wherein determining to change the radio resource to be allocated to the PoA comprises performing, by the PoA, the determination based on the recommendation on a change in radio resource from the access controller, wherein the access controller determines to recommend a change in radio resource allocation of the PoA and then notifies the PoA of radio resource to be allocated, and the PoA performs the determination based on the notification from the access controller.

7. The method of claim 1, wherein determining to change the radio resource to be allocated to the PoA comprises performing, by the access controller, the determination based on one or more of link status and radio resource allocation status of Point of Attachments (PoAs) managed by the access controller.

8. The method of claim 1, wherein determining to change the radio resource to be allocated to the PoA comprises performing, by the access controller, the determination based on radio resource allocation information of PoAs, which are managed by the access controller, obtained by inquiring the radio resource allocation information of the PoAs of the network configuration information server.

9. The method of claim 1, wherein commanding the terminal to connect via the new radio resource comprises:
   transferring, by an MIS user unit of the PoA, a command to command the terminal to connect via the new radio resource to a media independent services function (MISF) unit of the corresponding PoA; and
   transferring, by the MISF unit of the PoA, a command to command the terminal to connect via the new radio resource to an MISF unit of the terminal.

10. The method of claim 1, wherein commanding the terminal to connect via the new radio resource comprises:
    transferring, by an MIS user unit of the access controller, a command to command the terminal to connect via the new radio resource to a media independent services function (MISF) unit of the corresponding access controller; and
    transferring, by the MISF unit of the access controller, a command to command the terminal to connect via the new radio resource to an MISF unit of the terminal.

11. The method of claim 1, wherein changing the radio resource of the PoA comprises:
    commanding, by an MIS user unit of the PoA, a link layer unit of the corresponding PoA to change radio resource from current radio resource to new radio resource via an MISF unit of the corresponding PoA; and
    changing, by the link layer unit of the PoA, the radio resource from the current radio resource to the new radio resource based on the command.

12. The method of claim 1, wherein changing the radio resource of the PoA comprises:
    receiving, by an MISF unit of the PoA, a command to change the radio resource of the PoA to the new radio resource, which is generated by an MIS user unit of the access controller and output via an MISF unit of the corresponding access controller;
    commanding, by an MISF unit of the PoA, a link layer unit of the corresponding PoA to change the radio resource of the PoA to the new radio resource; and
    changing, by the link layer unit of the PoA, the radio resource of the PoA from current radio resource to the new radio resource based on the command.

13. The method of claim 1, wherein reporting the new radio resource to the network devices adjacent to the PoA comprises:
    requesting, by a link layer unit of the PoA, an MISF unit of the corresponding PoA to transmit a message reporting the new radio resource;
    transmitting, by the MISF unit of the PoA, a message reporting the new radio resource to MISF units of the network devices; and
    reporting, by the MISF units of the network devices, the new radio resource of the PoA to MIS user units of the corresponding network devices based on the received message.

14. An apparatus for managing radio resources of link layers of heterogeneous networks based on an MIS framework, comprising:
    circuitry configured to
    output its own link status and its radio resource allocation status via a link layer unit; and
    receive a report on the link status and radio resource allocation status from the link layer unit via a MISF unit and transfer this report to a MIS user unit, to receive a report on link status of a terminal from the corresponding terminal via the MISF unit and transfer this report to the MIS user unit, to receive a report on link status and radio resource allocation status of a neighboring PoA from the corresponding neighboring PoA via the MISF unit and transfer this report to the MIS user unit, to receive network configuration information from a network configuration information server via the MISF unit and transfer the network configuration information to the MIS user unit, and to receive a recommendation on a change in radio resources from an access controller via the MISF unit and transfer the recommendation to the MIS user unit,
    wherein the MIS user unit determines to change radio resource allocation to a new radio resource based on information from any one of the link layer unit, the terminal, the neighboring PoA the network configuration information server, and the access controller, and
    wherein the MISF unit reports the new radio resource to the neighboring PoA, the network configuration information server, and the access controller.

15. The apparatus of claim 14, wherein the MISF unit notifies the terminal of the new radio resource using current radio resource before changing its own radio resource, and reports the new radio resource to the MIS user unit.

16. The apparatus of claim 14, wherein the radio resource comprises a frequency band, transmission power, a time slot, and beamforming.

17. A system for managing radio resources, comprising:
    a network configuration information server configured to output network configuration information;
    a radio resource management PoA configured to allocate and change its own radio resource to a new radio resource based on any one of status of its own link layer, status of a link layer of a terminal received from the corresponding terminal, link status and radio resource allocation status of a corresponding neighboring PoA received from the neighboring PoA, network configuration information received from the network configuration information server, and a recommendation on a change in radio resource allocation received from an access controller; and
    the access controller configured to determine the recommendation on a change in radio resource allocation of the radio resource management PoA based on link status and radio resource allocation status of one or more PoAs managed by the access controller including one or more of the radio resource management PoA and the neighboring PoA, and the network configuration information from the network configuration information server,
    wherein the radio resource management PoA reports the new radio resource to the neighboring PoA, the network configuration information server, and the access controller.

18. The system of claim 17, wherein the radio resource management PoA distributes data traffic of the terminal among a plurality of link layers of the radio resource management PoA.

19. The system of claim 17, wherein the access controller distributes data traffic of the terminal among a plurality of radio resource management PoAs.

20. A method of managing radio resources, comprising:
    determining, by a Point of Attachment (PoA) managing radio resource of link layers of networks or by an access controller communicating with the PoA, to allocate radio resource to be allocated to the PoA;

commanding, by the PoA or by the access controller, a terminal to connect via new radio resource by using current radio resource;

allocating, by the PoA, the radio resource of the PoA based on a radio resource allocation change command from the PoA or the access controller;

receiving, by the PoA, any one of:
- one or more of link status and radio resource allocation status of a neighboring PoA from the neighboring PoA;
- radio resource allocation information of an adjacent network from a network configuration information server; and
- a recommendation on a change in radio resources from the access controller; and reporting, by the PoA, the new radio resource to network devices adjacent to the PoA comprising the neighboring PoA, the network configuration information server, and the access controller.

* * * * *